United States Patent [19]
Marutani et al.

[11] Patent Number: 5,773,511
[45] Date of Patent: Jun. 30, 1998

[54] RESIN COMPOSITION USED IN COATING COMPOSITION FOR COATING POLYOLEFIN RESIN MOLDINGS, COATING COMPOSITION COMPRISING SUCH RESIN COMPOSITION, AND PROCESS FOR COATING SUCH COATING COMPOSITION

[75] Inventors: Yoshiaki Marutani; Mika Ohsawa, both of Hiroshima, Japan

[73] Assignee: Mazda Motor Corporation, Hiroshima-Ken, Japan

[21] Appl. No.: 560,618

[22] Filed: Nov. 20, 1995

[30] Foreign Application Priority Data

Nov. 24, 1994 [JP] Japan .................................. 6-290101
Nov. 8, 1995 [JP] Japan .................................. 7-289757

[51] Int. Cl.$^6$ .......................... C08L 23/26; C08L 23/36; C08L 61/28
[52] U.S. Cl. ........................ 525/66; 428/502; 525/64; 525/69; 525/157; 525/160; 525/162; 525/163; 525/164
[58] Field of Search .................... 525/64, 66, 69, 525/157, 160, 162, 163, 164

[56] References Cited

U.S. PATENT DOCUMENTS 5,587,418  12/1996  Sasaki et al. ............................ 524/504

FOREIGN PATENT DOCUMENTS

| 57-200438 | 12/1982 | Japan . |
| 59-27968 | 2/1984 | Japan . |
| 62-149734 | 7/1987 | Japan . |
| 4-132783 | 5/1992 | Japan . |
| 5-117574 | 5/1993 | Japan . |

*Primary Examiner*—Fred Zitomer
*Attorney, Agent, or Firm*—Evenson, McKeown, Edwards & Lenahan, P.L.L.C.

[57] ABSTRACT

The present invention relates to a coating composition which is excellent in handling and safety, enables the curing of the resultant coating composition at low temperature, and provides an excellent adhesion to polyolefin resin moldings. The coating composition comprises (1) 40–90 wt. % of a grafted and chlorinated polyolefin oligomer obtained by graft polymerizing a vinyl polymerizable monomer to a chlorinated polyolefin, the grafted and chlorinated polyolefin oligomer having a primary or blocked primary hydroxyl group at a position of 15 to 40 atoms away from the vinyl graft polymer chain grafted to the chlorinated polyolefin, a number average molecular weight of 5,000 to 50,000, 0.4 to 2.5 mole/kg-resin of a primary or blocked primary hydroxyl group, 50 to 95 wt. % of said vinyl graft polymer chain, and 5 to 50 wt. % of the chlorinated polyolefin used as a starting material, and (2) 60 to 10 wt. % of an imino-type, methylol-type or complete alkoxy-type melamine resin. The present coating composition can be cured by baking the coating composition at 90° to 120° C.

18 Claims, No Drawings

RESIN COMPOSITION USED IN COATING COMPOSITION FOR COATING POLYOLEFIN RESIN MOLDINGS, COATING COMPOSITION COMPRISING SUCH RESIN COMPOSITION, AND PROCESS FOR COATING SUCH COATING COMPOSITION

TECHNICAL FIELD

The present invention relates, in particular, to a resin composition used in a coating composition which enables to directly coat polyolefin resin moldings by one coating and which allows the curing of the coating composition with safety and at lower temperature, as well as a coating composition using such resin composition and a process for coating such coating composition.

BACKGROUND OF INVENTION

Recently, resin articles other than metal articles and glass articles have become broadly used in the automobile exterior parts. For exmple, resin moldings have been widely used in bumpers, door mirror covers, moldings and spoilers. As those resin moldings, polyolefin resins have been increasingly used in an larger amount as compared with urethane resins, from an economical point of view. The polyolefin resins are excellent in respect of chemical resistance, water resistace and moldability.

Various restrictions are imposed on the coating of the polyolefin resin moldings, as compared with the coating of metal moldings. For example, the polyolefin resin is low polarity. Accordingly, the coating adhesion is poor. In addition, the polyolefin resin is weak against heat. Accordingly, it is necessary to dry the coating by heat at, for example, 120° C. or lower.

There have been proposed various processes for improving adhesion to the polyolefin resin moldings. For example, those processes include a process wherein the pre-treatment such as flame treatment, corona treatment, plasma treatment and chromium sulfate treatment is made on the surface of the resin moldings and then an overcoating is coated, and a process wherein the surface of the resin molding is first washed with a solvent such as trichloroethane, a good adhesive primer is coated thereon, and then an overcoating is coated. However, these processes do not always provide sufficient adhesion. Since the steps of these processes are many, the processes are troublesome. Further, the use of special and expensive primers necessarily makes the processes disadvantageous economically.

As processes for improving these processes, there have been proposed, for example, coating compositions comprising halogenated polyolefin resin, in order to improve the adhesion to the polyolefin resin moldings. These coating compositions include (1) a coating composition comprising a mixture of a halogenated polyolefin resin and an acrylic resin (Japanese Unexamined Laid-open Publication (hereinafter referred to as "J.P. Kokai") No. 57-200438); (2) a coating composition comprising a copolymer of a chlorinated polyolefin resin and acrylic monomer and, if necessary, a polyester prepolymer having a number average molecular weight of 500 to 3000 and an isocyanate compound (J.P. Kokai Nos. 59-27968, 62-149734 and 4-132783); (3) a coating composition comprsing a copolymer of a chlorinated polyolefin resin, an acrylic monomer and a chlorinated polydiene and an isocyanate compound (J.P. Kokai Nos. 59-27968, 62-149734 and 4-132783); and (4) a coating composition comprising a mixture of a chlorinated polyolefin resin and an acrylic resin or the product obtained by grafting an acrylic monomer to the chlorinated polyolefin, and a curing agent such as isocyanate prepolymer and melamine resin (J.P. Kokai No. 5-117574)

However, the coating composition (1) requires 35 wt. % or lower of a chlorine atom. In addition, the coating composition (1) is easy to separate into two phases. Accordingly, the properties of the coating composition (1), such as pigment suspension stability, coating brightness, coating adhesion, solvent resistance and weathering resistance, is not sufficient. In case of the coating composition (2), the stability of the coating composition (2) is better than that of the coating composition (1). However, the coating brightness and weathering resistance are not sufficient. In addition, since isocyanate compounds have a strong toxicity, there are problems in handling and in safety. In case of the coating composition (3), the solvent resistance and weathering resistance of the composition are not sufficient. In addition, the coating composition (3) has the problem associating with the use of the isocyanate compound as in the case of the coating composition (2). Further, the coating composition (4) has the toxicity problem when the composition uses the isocyanate prepolymer.

As stated above, there have been proposed various coating compositions. However, they are not suitable for the applications which require especially severe physical properties such as weathering resistance, for example, coating compositions for automobile bumpers, and the applications thereof are restricted.

Therefore, there is a strong demand for a coating composition which is excellent in handling and safety, enables the curing of the coating composition at low temperature, and provides an excellent adhesion to polyolefin resin moldings.

SUMMARY OF THE INVENTION

Accordingly, the present invention relates to a coating composition which is excellent in handling and safety, enables the curing of the coating composition at low temperature, and provides an excellent adhesion to polyolefin resin moldings, as well as a process for coating such coating composition.

In the course of the present inventors' intensive studies in order to achieve the above objective, the inventors have found that the chlorinated polyolefin oligomer which has been grafted with a vinyl monomer and has the specific chemical structure such as the position of the hydroxyl or blocked hydroxyl group, molecular weight, the amount of the hydroxyl group and the ratio of chlorinated polyolefin accomplishes the above object. The present invention has been completed based on this finding.

Specifically, the present invention relates to the following inventions.

1. A resin composition used in a coating composition for polyolefin resin moldings, comprising:
   (1) 40–90 wt. % of grafted and chlorinated polyolefin oligomer obtained by graft polymerizing a vinyl polymerizable monomer to a chlorinated polyolefin, the grafted and chlorinated polyolefin oligomer having a primary hydroxyl group at a position of 15 to 40 atoms away from the vinyl graft polymer chain grafted to the chlorinated polyolefin, a number average molecular weight of 5,000 to 50,000, 0.4 to 2.5 mole/kg-resin of a primary hydroxyl group, 50 to 95 wt. % of the graft polymer portion, and 5 to 50 wt. % of the chlorinated polyolefin used as a starting material, and
   (2) 60 to 10 wt. % of an imino-type, methylol-type or complete alkoxy-type melamine resin;

2. A coating composition for polyolefin resin moldings, comprising:
  (1) 40–90 wt. % of grafted and chlorinated polyolefin oligomer obtained by graft-polymerizing a vinyl polymerizable monomer to a chlorinated polyolefin, the grafted and chlorinated polyolefin oligomer having a primary hydroxyl group at a position of 15 to 40 atoms away from the vinyl graft polymer chain grafted to the chlorinated polyolefin, a number average molecular weight of 5,000 to 50,000, 0.4 to 2.5 mole/kg-resin of a primary hydroxyl group, 50 to 95 wt. % of the graft polymer portion, and 5 to 50 wt. % of the chlorinated polyolefin used as a starting material, and
  (2) 60 to 10 wt. % of an imino-type, methylol-type or complete alkoxy-type melamine resin, wherein the total acid value of the grafted and chlorinated polyolefin oligomer, the imino-type, methylol-type or complete alkoxy-type melamine and, if any, an acid curing catalyst is 5 to 50;
3. A resin composition used in a coating composition for polyolefin resin moldings, comprising:
  (1) 40–90 wt. % of grafted and chlorinated polyolefin oligomer obtained by graft-polymerizing a vinyl polymerizable monomer to a chlorinated polyolefin, the grafted and chlorinated polyolefin oligomer having a blocked primary hydroxyl group at a position of 15 to 40 atoms away from the vinyl graft polymer chain grafted to the chlorinated polyolefin, a number average molecular weight of 5,000 to 50,000, 0.4 to 2.5 mole/kg-resin of a blocked primary hydroxyl group, 50 to 95 wt. % of the graft polymer portion, and 5 to 50 wt. % of the chlorinated polyolefin used as a starting material, and
  (2) 60 to 10 wt. % of an imino-type, methylol-type or complete alkoxy-type melamine resin;
4. A coating composition for polyolefin resin moldings, comprising:
  (1) 40–90 wt.% of grafted and chlorinated polyolefin oligomer obtained by graft-polymerizing a vinyl polymerizable monomer to a chlorinated polyolefin, the grafted and chlorinated polyolefin oligomer having a blocked primary hydroxyl group at a position of 15 to 40 atoms away from the vinyl graft polymer chain grafted to the chlorinated polyolefin, a number average molecular weight of 5,000 to 50,000, 0.4 to 2.5 mole/kg-resin of a blocked primary hydroxyl group, 50 to 95 wt. % of the graft polymer portion, and 5 to 50 wt. % of the chlorinated polyolefin used as a starting material, and
  (2) 60 to 10 wt.% of an imino-type, methylol-type or complete alkoxy-type melamine resin; wherein the total acid value of the grafted and chlorinated polyolefin oligomer, the imino-type, methylol-type or complete alkoxy-type melamine and, if any, an acid curing catalyst is 5 to 50; and
5. A coating process comprising coating a coating composition of Items 2 and 4 above onto a polyolefin resin molding and baking the coating at 90° to 120° C.

The present invention will be explained in detail below.

A chlorinated polyolefin used for constituting the grafted and chlorinated polyolefin oligomer main chain is those polyolefins obtained by chlorinating a polyolefin polymer or its derivative wherein a carboxyl group is introduced into the polyolefin polymer. The polyolefin polymer includes polyethylene, polypropylene, ethylene-propylelene copolymer and polybutadiene.

The chlorine content of the chlorinated polyolefin is preferably 10 to 50 wt. %. When the chlorine content is larger than 50 wt. %, the adhesion to the polyolefin resin molding and the weathering resistance of the grafted and chlorinated polyolefin oligomer are apt to decrease. On the other hand, when the chlorine content of the chlorinated polyolefin is lower than 10 wt. %, the stability of the coating composition is apt to decrease at low temperature and the chlorinated polyolefin is apt to be deteriorated in affinity to the copolymerizable monomer as referred to below and the coating appearance is apt to be deteriorated.

The number average molecular weight of the chlorinated polyolefin is generally 3,000 to 100,000. preferably 5,000 to 50,000. When the number average molecular weight is smaller than 3,000, the solvent resistance, hardness and adhesion of the resultant coating composition are apt to be deteriorated. On the other hand, when the number average molecular weight is larger than 100,000, the coating viscosity is apt to be too large and therefore there may be the case where a diluent must be used, which would lead to lower solid content, thinner coating and poor coating producibility.

The specific chlorinated polyolefin includes Hardrene 15 LLB (chlorine content is 30 wt. %) and Hardrene 14 ML (chlorine content is 26 wt. %) which are both manufactured by Toyo Kasei, and Superchlon 822 manufactured by Sanyo Kokusaku Pulp (chlorine content is 25 wt. %).

The grafted and chlorinated polyolefin oligomer has a vinyl graft polymer portion having a primary or blocked primary hydroxyl group at a position of 15 to 40 atoms away from the vinyl graft polymer main chain grafted to the chlorinated polyolefin. The graft portion is formed on the chlorinated polyolefin oligomer, by graft polymerizing a vinyl polymerizable monomer to the chlorinated polyolefin.

As a process for intoducing a primary or blocked primary hydroxyl group into the prescribed position in the graft portion, the following processes can be used.

Method 1

This method comprises graft polymerizing a vinyl polymerizable monomer having a vinyl group and a primary or blocked primary hydroxyl group at a position of 15 to 40 atoms away from the vinyl group to a chlorinated polyolefin.

The vinyl polymerizable monomer used in this method includes a vinyl polymerizable monomer represented by the formula (1) below and a primary hydroxyl group, as a preferred monomer.

In the formula, $R^1$ is a hydrogen atom or a methyl group, Y is —COO—, a single bond or —O—. $R^2$ is an alkylene group having 13 to 38 carbon atoms. Especially, is preferred a (meth)acrylic oligomer wherein Y is —COO—. The alkylene group may be linear or branched and includes tridecylene and tetradecylene groups. The monomer above includes a primary hydroxyl group-containing alkyl (meth)acrylate such as 13-hydroxytridecyl(meth)acrylate and 14-hydroxytetradecyl(meth) acrylate. In order to make longer the distance between the vinyl group and the hydroxyl group, a lactone may be reacted with such monomers. The lactone includes ε-caprolactone, β-propionolactone, δ-valerolactone and τ-butyrolactone. Lactones are very useful for controlling the position of a hydroxyl group.

The vinyl polymerizable monomer having a blocked primary hydroxyl group includes, as preferred monomer, a vinyl polymerizable monomer prepared by blocking the vinyl polymerizable monomer represented by the formula (1) and represented by the following formula (2) below.

  (2)

In the formula, $R^1$, $R^2$ and Y are defined above and Z is a block group.

The preferred block group includes a silyl block group and a vinyl ether block group, respectively represented by the following formulae (3) and (4) below.

(A) Silyl Block Group

  (3)

In the formula above, $R^1$–$R^3$ are independently an alkyl or aryl group. The alkyl group includes a linear or branched alkyl group having 1–10 carbon atoms. The preferred alkyl groups include lower alkyl groups having 1–8 carbon atoms, such as a methyl group, an ethyl group, a propyl group, a butyl group, an s-butyl group, a t-butyl group, a pentyl group and a hexyl group. The aryl group includes a phenyl group, a naphthyl group and indenyl group, which may be substituted with a substituent. The preferred aryl group is a phenyl group.

The silyl block group represented by the formula (3) includes trimethylsilyl, diethylmethylsilyl, ethyldimethylsilyl, butyldimethylsilyl, butylmethylethylsilyl, phenyldimethylsilyl, phenyldiethylsilyl, diphenylmethylsilyl and diphenylethylsilyl. In particular, the lower the molecular weight of $R^1$–$R^3$, the lower the volatile content, and therefore it is preferable in view of the reduction of the amount of the organic solvent.

The blocking agent for forming such silyl block group preferably includes halogenated silanes. The halogen atom contained in the halogenated silanes includes a chlorine atom and a bromine atom. The examples of the blocking agents include trimethylsilyl chloride, diethylmethylsilyl chloride, ethyldimethylsilyl chloride, butyldimethylsilyl bromide and butylmethylethylsilyl bromide.

(B) Viny Ether Block Group

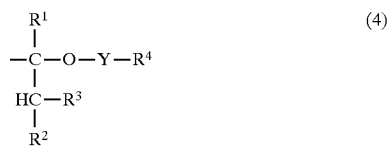  (4)

In the formula above, $R^1$, $R^2$ and $R^3$ are independently a hydrogen atom or a hydrocarbon group having 1–18 carbon atoms. $R^4$ is a hydrocarbon group having 1–18 carbon atoms. $R^3$ and $R^4$ may be combined to form a heterocyclic ring containing Y as a heteroatom. Y is an oxygen atom or a sulfur atom.

The hydrocarbon group includes an alkyl group, a cycloalkyl group and an aryl group. The alkyl group preferably includes lower alkyl groups having 1–8 carbon atoms, such as a methyl group, an ethyl group, a propyl group, a butyl group, an s-butyl group, a t-butyl group, a pentyl group and a hexyl group. The cycloalkyl group preferably includes a cyclopentyl group and a cyclohexyl group. The aryl group preferably includes a phenyl group, a naphthyl group and an anthracene group, which may have a substituent. A pheny group is most preferable as an aryl group.

The vinyl ether block group can be prepared by reacting a hydroxyl group with an aliphatic vinyl ether or thioether or a cyclic vinyl ether or thoiether. The aliphatic vinyl ether includes methylvinyl ether, ethylvinyl ether, isopropyl vinyl ether, n-propyl vinyl ether, isopropyl vinyl ether, 2-ethylhexyl vinyl ether and cyclohexyl vinyl ether, or vinyl thioether corresponding to these vinyl ethers. The cyclic vinyl ether includes 2,3-dihydrofuran, 3,4-dihydrofuran, 2,3-dihydro-2H-pyran, 3,4-dihydro-2H-pyran-2-one, 3,4-dihydro-2-methoxy-2H-pyran, 3,4-dihydro-4,4-dimethyl-2H-pyran, 3,4-dihydro-2-ethoxy-2H-pyran, and 3,4-dihydro-2H-pyran-2-carboxylic acid.

Method 2

This method comprises reacting lactone with a vinyl polymerizable monomer having a primary hydroxyl group at a position of 2 to 12 atoms away from the vinyl group, to prepare a vinyl polymerizable monomer having a primary hydroxyl group at a position of 15 to 40 atoms away from the vinyl group (lactone adduct or polyester oligomer), and graft polymerizing the resultant monomer to chlorinated polyolefin. In this case, the reaction of the blocking agent with the monomer provides a vinyl polymerizable monomer having a blocked primary hydroxyl group at a position of 15 to 40 atoms away from the vinyl group.

The vinyl polymerizable monomer before the reaction thereof with a lactone is suitably the monomer wherein in the formula (1), $R^2$ is an alkylene group having 2 to 10 carbon atoms. The vinyl polymerizable monomer obtained by the reaction with a lactone and having a primary hydroxyl group or a blocked primary hydroxyl group at a position of 15 to 40 atoms away from the vinyl group is suitably represented by the following formulae (5) and (6):

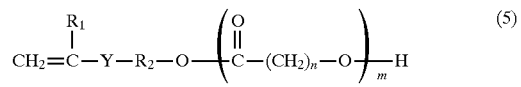  (5)

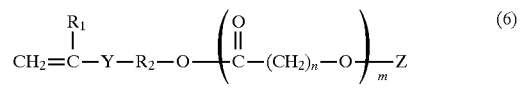  (6)

In the formulae, $R^1$, Y and Z are defined above. $R^2$ is an alkylene group having 2 to 10 carbon atoms as defined above, n is 2 to 7, preferably 2 to 5, m is 1 to 10, preferably 2 to 8.

The alkylene group as $R^2$ includes a linear or branched alkylene group, such as an ethylene group, a propylene group, a butylene group, an isobutylene group, and a hexamethylene group.

The vinyl polymerizable monomer represented by the formula (5) may be prepared by reacting a lactone with a primary hydroxyl or secondary hydroxyl group-containing alkyl(meth)acrylate such as 2-hydroxyethyl(meth)acrylate, 3-hydroxypropyl(meth)acrylate, 2-hydroxypropyl(meth) acrylate and 4-hydroxybutyl(meth)acrylate. On the other hand, the blocked primary hydroxyl group-containing vinyl polymerizable monomer represented by the formula (6) may be prepared by blocking the hydroxyl group of the vinyl polymerizable monomer represented by the formula (5).

The specific examples of the vinyl polymerizable monomer (lactone adduct) includes Placcel FM-1, FM-2, FM-3, FM-4, FA-1, FA-2, FA-3 and FA-4 (manufactured by Daisel Ltd.). In this case, "FM" means that the monomer is a methacrylate monomer. "FA" means that the monomer is an acrylate monomer. The number after the indication "FM-" and "FA-" means the number of the lactone (such as ε-caprolactone) as added.

In particular, the preferred vinyl polymerizable monomer is represented by the formula (7) below.

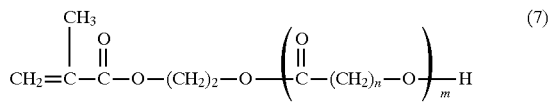

In the formula, n is 2 to 7 and m is 1 to 10.

Method 3

This method comprises graft polymerizing a vinyl polymerizable monomer having a primary hydroxyl group at a position of 2 to 12 atoms away from the vinyl group thereof to chlorinated polyolefin, and then adding a lactone to the hydroxyl group of the resultant grafted and chlorinated polyolefin oligomer so that a primary hydroxyl group is introduced into the resultant grafted and chlorinated polyolefin oligomer at a position of 15 to 40 atoms away from the vinyl graft polymer main chain thereof. In this case, the blocking of the hydroxyl group of the resultant grafted and chlorinated polyolefin oligomer provides a grafted and chlorinated polyolefin oligomer having a blocked primary hydroxyl group at a position of 15 to 40 atoms away from the vinyl graft polymer main chain of the resultant grafted and chlorinated polyolefin oligomer.

Method 4

This method comprises graft polymerizing chlorinated polyolefin with a vinyl polymerizable monomer prepared by reacting a carboxyl group-containing compound with a vinyl polymerizable monomer having an epoxy group and then adding a lactone to the secondary hydroxyl group of the resultant monomer or prepared by reacting an epoxy group-containing compound with a vinyl polymerizable monomer having a carboxyl group and then adding a lactone to the secondary hydroxyl group of the resultant monomer, to produce grafted and chlorinated polyolefin oligomer having a primary hydroxyl group at a position of 15 to 40 atoms away from the vinyl graft polymer main chain. Also, in this case, the blocking of the hydroxyl group of the resultant grafted and chlorinated polyolefin oligomer provides a grafted and chlorinated polyolefin oligomer having a blocked primary hydroxyl group.

A vinyl polymerizable monomer having an epoxy group or a carboxyl group preferably includes a vinyl polymerizable monomer represented by the formula (8) below.

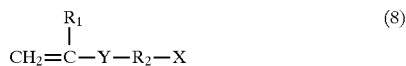

In the formula, $R^1$, Y and $R^2$ are defined above. X is an epoxy group or a carboxyl group.

The preferred vinyl polymerizable monomer having an epoxy group includes glycidyl (meth)acrylate. On the other hand, the preferred vinyl polymerizable monomer having a carboxyl group includes (meth) acrylic acid and crotonic acid.

Any carboxyl group-containing compound may be used so long as the compound does not have any vinyl polymerizable unsaturated group. Such compound preferably includes an aliphatic acid such as capric acid and caprylic acid, as well as semi-esters prepared by reacting alcohols such as diols and triols with an acid anhydride such as phthalic anhydride and succinic anhydride.

On the other hand, any epoxy group-containing compound may be used so long as it does not contain any vinyl group. The opoxy group-containing compound preferably includes epoxides of aliphatic monoepoxy compounds having an unsaturated bond, such as epoxide of α-olefins, glycidyl ethers and glycidyl esters. The epoxides of α-olefins are preferably those having 3 to 25 carbon atoms, such as propylene oxides and AOEX24 (a mixture of epoxides of α-olefins having 12 and 14 carbon atoms) and AOEX68 (a mixture of epoxides of α-olefins having 16 and 18 carbon atoms) (manufactured by Daisel Ltd.). Preferred glycidyl ethers include butyl glycidyl ether, phenyl glycidyl ether, decyl glycidyl ether, and cresyl glycidyl ether. Preferred glycidyl esters include Cajular E10 or PES10 (manufactured by Uka Shell).

Method 5

This method comprises graft polymerizing chlorinated polyolefin with a vinyl polymerizable monomer having an epoxy group, reacting the epoxy group of the resltant oligomer with a carboxyl group-containing compound to produce an oligomer having a secondary hydroxyl group, and then reacting a lactone with the hydroxyl group of the oligomer to produce a grafted and chlorinated polyolefin oligomer having a primary hydroxyl group at a position of 15 to 40 atoms away from the vinyl graft polymer main chain. In this case, also, the blocking of the hydroxyl group of the resultant grafted and chlorinated polyolefin oligomer provides a grafted and chlorinated polyolefin oligomer having a blocked primary hydroxyl group at a position of 15 to 40 atoms away from the vinyl graft polymer main chain.

Method 6

This method comprises graft polymerizing chlorinated polyolefin with a carboxyl group-containing vinyl polymerizable monomer, reacting an epoxy group-containing compound with the carboxyl group of the resultant polyolefin oligomer to produce an oligomer having a secondary hydroxyl group, reacting a lactone with the secondary hydroxyl group of the oligomer so as to produce a grafted and chlorinated polyolefin oligomer having a primary hydroxyl group at a position of 15 to 40 atoms away from the vinyl graft polymer main chain thereof. In this case, also, the blocking of the hydroxyl group of the resultant grafted and chlorinated polyolefin oligomer provides a grafted and chlorinated polyolefin oligomer having a blocked primary hydroxyl group at a position of 15 to 40 atoms away from the vinyl graft polymer main chain.

Method 7

This method comprises reacting a polyol (such as a diol, triol or tetraol) with an acid anhydride and/or a dibasic acid at an equimolar ratio in respect of a functional group to produce a compound having a carboxyl group and a hydroxyl group at both ends thereof, reacting this compound with a vinyl polymerizable monomer having an epoxy group or an isocyanate group, and then graft polymerizing the resultant monomer to chlorinated polyolefin.

The epoxy group and isocyanate group of the monomer reacts with a carboxyl group, to produce a vinyl polymerizable monomer having a hydroxyl group at the end thereof. In this case, also, the blocking of the hydroxyl group of the resultant grafted and chlorinated polyolefin oligomer provides a grafted and chlorinated polyolefin oligomer having a blocked primary hydroxyl group at a position of 15 to 40 atoms away from the vinyl graft polymer main chain.

Polyols include diols such as ethylene glycol, propylene glycol, 1,5-hexanediol, 1,6-hexanediol, neopentyl glycol and cyclohexanedimethanol; triols such as trimethylol propane, trimethylol ethane and glycerin; and tetraols such as pentaerythritol and diglycerin.

The anhydride includes phthalic anhydride, an alkyl phthalic anhydride such as 4-methyl phthalic anhydride; an alkyl hexahydrophthalic anhydride such as hexahydrophthalic anhydride, 3-methyl hexahydrophthalic anhydride and 4-methyl hexahydrophthalic anhydride; succinic anhydride; and tetrahydrophthalic anhydride. In particular, the preferred anhydride includes an alkyl phthalic anhydride and an alkyl hexahydrophthalic anhydride, in view of the easy synthesis thereof.

The dibasic acid includes phthalic acid; an alkyl phthalic acid such as 4-methyl phthalic acid; an alkyl hexahydrophthalic acid such as hexahydrophthalic acid, 3-methyl hexahydrophthalic acid and 4-methyl hexahydrophthalic acid; succinic acid; and tetrahydrophthalic acid.

The isocyanate group-containing monomer preferably includes those represented by the formula (8) wherein X is an isocyanate group. The specific examples of such monomers include isocyanate alkyl (meth) acrylate such as isocyanate ethyl (meth)acrylate.

Method 8

This method comprises reacting a vinyl polymerizable monomer having an epoxy group or an isocyanate group with a polyester oligomer prepared by reacting a polyol with an acid anhydride at an equimolar ratio in respect of a functional group to produce a polyester oligomer having a carboxyl group and a hydroxyl group at both ends thereof and reacting a lactone with the hydroxyl group of the polyester oligomer or by reacting a polyol with a lactone and then reacting an acid anhydride and/or a dibasic acid at an equimolar ratio in respect of a functional group; and then graft polymerizing the resultant vinyl polymerizable monomer to chlorinated polyolefin. In this case, also, the blocking of the hydroxyl group of the resultant grafted and chlorinated polyolefin oligomer provides a grafted and chlorinated polyolefin oligomer having a blocked primary hydroxyl group at a position of 15 to 40 atoms away from the vinyl graft polymer main chain.

Method 9

This method comprises reacting a polyol with a lactone to produce a compound having a hydroxyl group at both ends thereof, reacting the compound with a monomer having a vinyl group and an isocyanate group, and then graft polymerizing the resultant monomer to chlorinated polyolefin, or comprises graft polymerizing a monomer having a vinyl group and an isocyanate group to chlorinated polyolefin and reacting the isocyanate group of the resultant grafted and chlorinated polyolefin oligomer with a compound having a hydroxyl group at both ends thereof prepared by reacting a polyol with a lactone.

As stated above, the grafted and chlorinated polyolefin oligomer having a primary or blocked primary hydroxyl group at a prescribed position away from the vinyl graft polymer main chain may be prepared by directly or indirectly graft polymerizing chlorinated polyolefin with a vinyl polymerizable monomer having a primary or blocked primary hydroxyl group. The other alternative methods may be considered for introducing a primary or blocked primary hydroxyl group into a prescribed position away from the vinyl graft polymer main chain of the grafted and chlorinated polyolefin oligomer. These methods are readily obvious to a person skilled in the art in view of the above methods. In this connection, the graft portion of the grafted and chlorinated polyolefin oligomer may contain a functional group such as an ester bond and an urethane bond between the primary or blocked primary hydroxyl group and the grafted and chlorinated polyolefin oligomer.

The amount of the graft portion of the grafted and chlorinated polyolefin oligomer having a primary or blocked primary hydroxyl group at the prescribed position is such that the amount of the chlorinated polyolefin as a starting material is 5 to 50 wt. %, preferably 10 to 40 wt. % and that the graft portion is 50 to 95 wt. %, preferably 60 to 90 wt. %. When the amount of the chlorinated polyolefin is less than 5 wt. %, the adhesive of the resultant coating is deteriorated. On the other hand, when the amount of the chlorinated polyolefin is larger than 50 wt. %, the solvent resistance and weathering resistance of the resultant coating are reduced.

The graft polymerization of the chlorinated polyolefin may be carried out by the known conventional methods. For example, the graft polymerization may be carried out by radical polymerization. The radical polymerization should be preferably carried out in solutions. The solvents used for such polymerization may be any solvents conventionally used for the radical polymerization of vinyl polymerizable monomers such as acrylic monomers in solutions. The solvents include toluene, xylene and solvesso (manufactured by Exxon).

The radical initiator used for the radical solution polymerization may be any initiators conventionally used for the radical polymerization. The initiator includes peroxides such as benzoyl peroxide, lauroyl peroxide, t-butyl hydroperoxide and t-butylperoxy-2-ethylhexanol and azo compounds such as azobis-valeronitrile, azobis-isobutyronitrile and azobis(2-methypropiononitrile).

In this connection, a vinyl polymerizable monomer other than the above vinyl polymerizable monomer used for constituting the graft portion having a primary or blocked primary hydroxyl group at the prescribed position from the vinyl graft polymer main chain may be used together with the latter vinyl polymerizable monomer. The other monomers include α, β-ethylenically unsaturated monomer. The α, β-ethylenically unsaturated monomer includes the following monomers.

(1) Acrylic acid or methacrylic acid or esters thereof

For example, a carboxyl group-containing vinyl polymerizable monomer such as acrylic acid and methacrylic acid; C2-18 alkyl esters of acrylic or methacrylic acid, such as methyl acrylate, ethyl acrylate, propyl acrylate, butyl acrylate, isobornyl acrylate, methyl methacrylate, ethyl methacrylate, propyl methacrylate, butyl methacrylate, isobornyl methacrylate, isopropyl (meth)acrylate, octyl (meth)acrylate and 2-ethylhexyl (meth)acrylate; and C2-8 alkenyl esters of (meth)acrylic acid, such as allyl (meth)acrylate.

For example, by using a carboxyl group-containing vinyl polymerizable monomer, a carboxyl group may be introduced the grafted and chlorinated polyolefin oligomer.

(2) vinyl aromatic compound

For example, styrene, α-methyl styrene, vinyltoluene and p-chlorostyrene.

(3) Polyolefin compounds

For example, butadiene, isoprene and chloroprene.

(4) Others

For example, methacrylamide, acrylamide, diacrylamide, dimethacrylamide, acylonitrile, methacrylonitrile, methyl isopropenyl ketone, vinyl acetate, vinyl propionate, vinyl pivalate, N,N-dialkylaminoalkyl(meth)acrylate, phosphoric acid-containing (meth) acrylate such as phosphonoxyethyl (meth)acrylcate, and perfluorovinyl ether such as trifluoromethyl vinyl ether.

These copolymerizable monomers are generally used in an amount of 0 to 850 wt. %, preferably 0 to 800 wt. % based on the graft portion containing a primary or blocked primary hydroxyl group at the prescribed position.

The number average molecular weight (Mn) of the resultant grafted and chlorinated polyolefin oligomer is 5,000 to 50,000. When the Mn of the grafted and chlorinated polyolefin oligomer is smaller than 5,000, the gasoline resistance and weathering resistance of the resultant coating are deteriorated. On the other hand, when the Mn is larger than 50,000, the viscosity of the coating composition increases to much degree, it is necessary to use much solvent, the solid content of the coating composition is reduced and it is difficult to make thicker the coating thickness, and therefore the coating efficiency is deteriorated. The Mn is preferably 7,000 to 35,000.

The weight average molecular weight (Mw) of the resultant grafted and chlorinated polyolefin oligomer is 5,000 to 100,000. When the Mw of the grafted and chlorinated polyolefin oligomer is smaller than 5,000, the gasoline resistance, water resistance and weathering resistance of the resultant coating are apt to decrease. On the other hand, when the Mw is larger than 100,000, the coating efficiency is apt to be deteriorated. The Mw is preferably 10,000 to 90,000.

The primary or blocked primary hydroxyl group is located at a position of 15 to 40 atoms away from the vinyl graft polymer main chain. When the distance of the primary or blocked primary hydroxyl group to the vinyl graft polymer main chain is near by less than 15 atoms, the reactivity and solvent resistance of the coating are reduced. On the other hand, when the distance of the primary or blocked primary hydroxyl group to the vinyl graft polymer main chain is remote by more than 40 atoms, the coating is too flexible and solvent resistance of the coating is reduced. The preferred distance to the vinyl graft polymer main chain is 22 to 35 atoms.

The amount of the primary or blocked primary hydroxyl group of the grafted and chlorinated polyolefin oligomer is 0.4 to 2.5 moles/kg-resin. When the amount is less than 0.4 moles/kg-resin, the cross-linking becomes insufficient. On the other hand, when the amount is larger than 2.5 mole/kg-resin, the resultant coating becomes too flexible and accordingly the solvent resistance of the resultant coating is reduced. The preferred amount of the primary or blocked primary hydroxyl group is 1.0 to 1.8 mole/kg-resin.

The curing agent to react with free hydroxyl group of the grafted and chlorinated polyolefin oligomer is selected from the group consisting of an imino-type, methylol-type and complete alkoxy-type melamine resin. Since the present invention does not use any isocyanate compound as a curing agent, the handling and safety of the coating composition are excellent.

The Mn of the imino-type, methylol-type or complete alkoxy-type melamine resin is preferably 300 to 4,000, much preferably 1,000 to 3,000. When the Mn of the melamine resin is lower than 300, the gasoline resistance, water resistance and weathering resistance of the resultant coating are apt to be deteriorated. On the other hand, when the Mn is larger than 4,000, the coating efficiency is apt to be deteriorated.

The Mw of the melamine resin is preferably 300 to 20,000, much preferably 1,000 to 15,000. When the Mw of the melamine resin is lower than 300, the gasoline resistance, water resistance and weathering resistance of the resultant coating are apt to be deteriorated. On the other hand, when the Mn is larger than 20,000, the coating efficiency is apt to be deteriorated.

The imino-type melamine resin includes Superbeckamine L-121-60 (manufactured by Dainippon Ink & Chemicals, Inc.) (Solid content: 60%, Mn:1500, Mw:4100), Uvan 22R (manufactured by Mitsui Toatsu Chemicals, Inc.) (Solid content: 60%, Mn:1600, Mw:7500), Uvan 21R (manufactured by Mitsui Toatsu Chemicals, Inc.) (Solid content: 50%, Mn:1600, Mw:7500), and Uvan 2028 (manufactured by Mitsui Toatsu Chemicals, Inc.) (Solid content: 75%, Mn:1000, Mw:1500).

The methylol-type melamine resin includes Uvan 60R (manufactured by Mitsui Toatsu Chemicals, Inc.) (Solid content: 50%, Mn:1500, Mw: 7500).

The complete alkoxy-type melamine resin includes Cymel 303 (manufactured by Mitsui Cyanamid) (Solid content: 98%, Mn: 470, Mw: 600).

The grafted and chlorinated polyolefin oligomer is used in an amount of 40–90 wt. % based on the total amount of the grafted and chlorinated polyolefin oligomer and the melamine resin. Accordingly, the melamine resin is used in an amount of 60–10 wt. % based on the total amount of the grafted and chlorinated polyolefin oligomer and the melamine resin. When the amount of the grafted and chlorinated polyolefin oligomer is less than 40 wt. %, the self-condensation reaction of the melamine resin becomes preferential and therefore the coating becomes brittle and the coating composition is not suitable for polyolefin resin moldings. On the other hand, when the amount of the grafted and chlorinated polyolefin oligomer is larger than 90 wt. %, the cross-linking becomes insufficient and the solvent resistance and weathering resistance of the resultant coating are deteriorated. The preferred amount of the grafted and chlorinated polyolefin oligomer is 50–85 wt. %, and accordingly, the preferred amount of the melamine resin is 15–50 wt. %.

The total acid value of the grafted and chlorinated polyolefin oligomer, the melamine resin and an acid curing catalyst if used is 5–50, preferably 10–50, much preferably 15–50. When the total acid value is less than 5, the cross-linking reactivity is decreased and accordingly, the cross-linking is insufficient and the gasoline resistance and weathering resistance of the resultant coating are deteriorated. On the other hand, when the total acid value is larger than 50, the storage stability is decreased and the water resistance of the resultant coating is deteriorated. Within this total acid value, the blocked hydroxyl group releases a blocking group to produce a free hydroxyl group.

In order to provide an acid value to the grafted and chlorinated polyolefin oligomer, monomers having a functional group providing an acid value such as a carboxyl group or phosphoric group are used as a vinyl polymerizable monomer to be used in the graft polymerization so as to introduce such a functional group into the grafted and chlorinated polyolefin oligomer.

The acid curing catalyst used in the present invention is an important component to prepare a low temperature curing coating composition and to function to dissociate the blocking group from the blocked hydroxyl group in the presence of water content in air in case of a grafted and chlorinated polyolefin oligomer having a blocked hydroxyl group.

The curing catalyst includes strong acidic catalysts and weak acidic catalysts. The strong acidic catalysts include inorganic acids such as hydrochloric acid, nitric acid and sulfuric acid, organic acids such as sulfonic acids, and the esters, ammonium salts and onium salts thereof. In particular, the strong acidic catalysts are preferably sulfonic acids, their esters, their amine salts, benzoic acid and trichloroacetic acid. The sulfonic acids include aliphatic sulfonic acids such as methanesulfonic acid and ethanesulfonic acid, and aromatic sulfonic acids such as p-toluenesulfonic acid, dodecylbenzene sulfonic acid, naphthalene disulfonic acid, dinonyl naphthalene sulfonic acid and dinonyl naphthalene disulfonic acid. Preferred strong acidic catalysts include aromatic sulfonic acids and their esters, such as p-toluenesulfonic acid and dinonyl naphthalene disulfonic acid, in view of improved water resistance of the resultant coating.

The weak acidic catalysts include phosphric acid, monoesters of phosphoric acid, esters of phosphorous acid, esters of unsaturated group containing phosphoric acid and carboxylic acids. Preferred weak acidic catalysts include phosphoric acid and its esters, such as phosphoric acid, pyrophosphoric acid and mono- or diesters of phosphoric acid. The monoesters of phosphoric acid include monooctyl phosphate, monopropyl phosphate and monolauryl phosphate. The diesters of phosphoric acid include dioctyl phosphate, dipropyl phosphate and dilauryl phosphate. The weak acid catalysts also include mono(2-(meth)acryloyloxyethyl) acid phosphate. Further, the weak acid catalyst includes a compound obtained by reacting an acid anhydride-containing compound with a polyol or an alcohol. Further, oligomers having an acid value may be blended. In this case, a method for introducing an acid value into the grafted and chlorinated polyolefin oligomers and other oligomers comprises using a vinyl polymerizable monomer having a carboxyl group or a phosphoric acid group in the graft polymerization. It is preferable that the carboxyl group or phosphoric acid group be positioned 10 atoms or more away from the oligomer main chain and in such a case, the coating composition is reactive at a low temperature.

The curing catalysts are used in an amount of 0.001 to 10 wt. %, preferably 0.001 to 5 wt. %, based on the total weight of the grafted and chlorinated polyolefin oligomer and the melamine resin.

In preparing a resin composition or coating composition, the grafted and chlorinated polyolefin oligomer is used as it is, or in a combination thereof with various additives such as coloring pigments or loading pigments, aluminum powder, pearl mica powder, anti-sagging agents or anti-settling agents, leveling agents, dispersants, anti-foaming agents, ultraviolet ray-absorbing agents, light stabilizers, anti-static agents, thinners and the like, which are conventionally used in the coating field.

The preferred examples of the pigments include inorganic pigments such as titanium oxide (such as Typaque CR-95 manufactured by Chiba Geigy), carbon black, iron oxide, red iron oxide, lead molybdate, chromium oxide and lead chromate; and organic pigments such as phthalocyanine pigments, e.g., phthalocyanine green, quinacridone red, azo pigments and anthraquinone pigments.

The preferred examples of the loading pigments include kaolin, talc, silica, mica, barium sulfate and calcium carbonate.

The preferred examples of the anti-sagging agents or anti-settling agents include bentonite, castor oil wax, amide wax, microgel (such as MG100S manufactured by Dainippon Ink & Chemicals, Inc.) and alumium acetate.

The preferred examples of the leveling agents include silicon-type agents such as KF69, KP321 and KP301 (manufactured by The Shin-Etsu Chemical Co., Ltd.), Modaflow (a surfactant manufactured by Mitsubishi Monsant), silicon-type agents such as BYK301 and 358 (manufactured by BYK Chemie Japan KK), and Diaaid (manufactured by Mitsubishi Rayon Co., Ltd.).

The preferred examples of the dispersants include Anti-Terra U, Anti-Terra P and Disperbyk 101 (manufactured by BYK-Chemie Japan KK).

The preferred examples of the anti-foaming agents include BYK-O (manufactured by BYK Chemie Japan KK).

The preferred examples of the ultraviolet ray-absorbing agents include benzotriazol-type ultraviolet ray-absorbing agents such as Tinuvin 900, Tinuvin 384 and Tinuvin P (manufactured by Chiba Geigy) and oxalic anilide-type ultraviolet ray-absorbing agents such as Sanduvor 3206 (manufactured by Sandoz KK).

The preferred examples of the light stabilizers include hindered amine light stabilizers such as Sanol LS292 (manufactured by Sankyo Co., Ltd.) and Sanduvor 3058 (manufactured by Sandoz KK).

The thinners include aromatic compounds such as toluene, xylene and ethylbenzene; alcohols such as methanol, ethanol, propanol, butanol and isobutanol; ketons such as acetone, methylisobutyl ketone, methylamyl ketone, cyclohexanone, isophorone and N-methylpyrrolidone; esters such as ethyl acetate, butyl acetate and methyl cellosolve; and mixtures thereof.

The anti-static agents include Esocard C25 (manufactured by Lion Armor).

The present coating composition may be prepared by mixing the grafted and chlorinated polyolefin oligomer, the melamine resin and the acid curing catalyst if used, as well as necessary additives such as pigments, and uniformly dispersed by dispersing machines such as sand grind mill, ball mill and attritor.

When the present coating composition is applied to the polyolefin resin moldings, the resin moldings are first subjected to degreasing washing treatment such as degreasing washing with an organic solvent such as 1,1,1-trichloroethane, alkaline degreasing washing, acid washing and solvent wiping and then directly coated with the present coating composition using, e.g., spray coating and air-less coating. The coating is cured by heat (baked) at a low temperature of 90° to 120° C., preferably 100° to 110° C., if necessary after the coating is set for 0.5 to 120 min., preferably 1 to 20 min.

According to the present invention, the coating composition can be cured by heat at a low temperature below 120° C. Therefore, the present coating composition enables the coating having excellent coating properties to be coated on the polyolefin resin moldings without causing any damage.

The present coating composition is coated by the manners comprising a one coat-one bake coating, a two coat-one bake coating and three coat-two bake coating. The one coat-one bake coating is to coat a facing coating once and then bake the coating. The two coat-one bake coating is one of the coating method for a facing coating and is to coat a base coat containing a pigment and/or metal powder, coat a top coating of a transparent clear coating or a color clear coating having a less pigment content on the base coating, and then bake the resultant coating laminate. In this case, the base coating may be the present coating composition and the top coating may be a conventional coating composition. The three coat-two bake coating is to coat a coating containing a pigment, dye and/or metal powder, coat a top coating of a transparent clear coating or a color clear coating having less pigment on the base coating, bake the resultant coating laminate, coat thereon a base coating containing a pigment, dye and/or metal powder, coat a top coating of a transparent clear coating or a color clear coating having a less pigment or dye content on the base coating, and then bake the resultant coating laminate.

EXAMPLES

The present invention will be further explained in more detail below with reference to the synthesis examples and the application examples. In this case, the terms "part" and "%" mean those by weight, if otherwise indicated below.
Synthesis of grafted and chlorinated polyolefin oligomers having an unblocked primary hydroxyl group

Synthesis Example 1

Into a four-necked flask with a stirrer, a thermometer, an inlet for introducing an inert gas, a dropping funnel and a refluxing device, 494 parts of toluene and 250 parts of Hardrene 14 ML manufactured by Toyo Kasei (chlorinated polyolefin having a chlorine content of 26%) were introduced and heated at 100° C. while stirring. Then, 129 parts of Placcel FM-2, 17 parts of styrene, 100 parts of t-butyl methacrylate and a mixture containing 6 parts of benzoyl peroxide and 4 parts of azobisisobutyronitrile were dropped into the flask over 3 hrs. and the reaction was continued for 6 hrs., to produce a grafted and chlorinated polyolefin oligomer O-1. The formulation of the feed materials for the synthesis and the properties of the resultant oligomer are listed in Table 1 below.

Synthesis Examples 2–21

Synthesis Example 1 was repeated except that the formulation for the feed material as shown in Table 1 was used, to produce grafted and chlorinated polyolefin oligomers O-2 to O-23. The properties of the resultant oligomers are shown in the table.
Synthesis of grafted and chlorinated polyolefin oligomers having a blocked primary hydroxyl group

Synthesis Examples 24–34

Synthesis Example 1 was repeated except that the formulation for the feed material as shown in Table 2 below was used, to produce grafted and chlorinated polyolefin oligomers B-1 to B-11 having a blocked primary hydroxyl group. The properties of the resultant oligomers are shown in Table 2.

TABLE 1

|  | Syn. Ex. 1 O-1 | Syn. Ex. 2 O-2 | Syn. Ex. 3 O-3 | Syn. Ex. 4 O-4 |
|---|---|---|---|---|
| Properties |  |  |  |  |
| Solid content | 30 | 30 | 30 | 51 |
| OH position* | 19 | 26 | 33 | 33 |
| Mn | 15000 | 15000 | 15000 | 18000 |
| Mw | 75000 | 75000 | 75000 | 80000 |
| Amount of functional group (mole/kg-resin) |  |  |  |  |
| Hydroxyl group | 1.2 | 1.0 | 1.0 | 1.0 |
| Amount of chlorinated polyolefin used (%) | 24 | 24 | 24 | 9 |
| Feed material |  |  |  |  |
| Toluene | 495 | 495 | 495 | 385 |
| Hardrene 14ML | 250 | 250 | 250 | 200 |
| Placcel FM-2** | 129 |  |  |  |
| Placcel FM-3** |  | 142 |  |  |
| Placcel FM-4** |  |  | 179 | 299 |

TABLE 1-continued

| Isobornyl methacrylate |  | 104 | 70 | 107 |
|---|---|---|---|---|
| Styrene | 17 |  |  |  |
| t-Butyl methacrylate | 100 |  |  |  |
| Benzoyl peroxide | 6 | 6 | 6 | 6 |
| Azobisisobutyronitrile | 4 | 4 | 4 | 4 |

Note *) The OH position means the position of a primary hydroxyl group expressed as the number of atoms between the hydroxyl group and the vinyl graft polymer main chain of the grafted and chlorinated polyolefin oligomer.
**) Placcel FM-2 to 4 are products by Daisel Ltd. and represented by the following formulae.

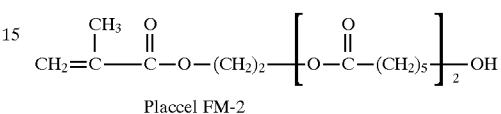

Placcel FM-2

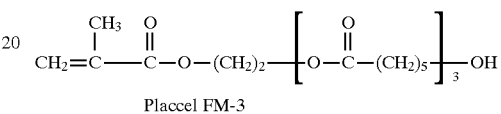

Placcel FM-3

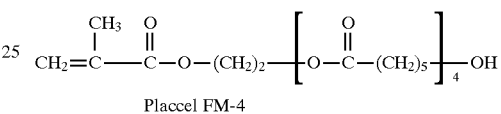

Placcel FM-4

|  | Syn. Ex. 5 O-5 | Syn. Ex. 6 O-6 | Syn. Ex. 7 O-7 | Syn. Ex. 8 O-8 |
|---|---|---|---|---|
| Properties |  |  |  |  |
| Solid content | 33 | 30 | 50 | 50 |
| OH position | 26 | 22 | 22 | 26 |
| Mn | 16000 | 16000 | 19000 | 16000 |
| Mw | 75000 | 75000 | 80000 | 75000 |
| Amount of functional group (mole/kg-resin) |  |  |  |  |
| OH | 0.9 | 1.0 | 1.0 | 1.0 |
| Amount of chlorinated polyolefin used (%) | 49 | 24 | 3 | 0 |
| Feed material |  |  |  |  |
| Toluene | 293 | 495 | 465 | 500 |
| Hardrene 14ML | 540 | 250 | 50 |  |
| Placcel FM-3 | 140 |  |  | 236 |
| Polyester macromer M-1* |  | 150 | 250 |  |
| Isobornyl methacrylate | 18 |  | 150 | 130 |
| n-Butyl acrylate |  |  |  | 49 |
| n-Butyl methacrylate |  |  | 76 | 75 |
| t-Butyl methacrylate |  | 96 |  |  |
| Benzoly peroxide | 6 | 6 | 6 | 6 |
| Azobisisobutyronitrile | 4 | 4 | 4 | 4 |

Note *) Polyester macromer M-1 is a hydroxyl group-containing polyester as prepared as follows:

Synthesis of Polyester macromer M-1

Into a four-necked flask with a stirrer, a thermometer, an inlet for introducing an inert gas, a dropping funnel and a refluxing device, 168 parts of 4-methylhexahydrophthalic anhydride and 208 parts of neopentyl glycol were introduced and heated at 140° C. for one hour while stirring, and then heated from 140° C. to 230° C. at a constant heating rate over 4 hrs. while distilling out the resultant condensed water. Then, the pressure in the flask was reduced and the system in the flask was maintained at 230° C. to continue the condensation reaction. When it was confirmed that the acid value was 2 or less, the reaction was stopped and the reaction mixture was cooled at 80° C. Then, 155 parts of isocyanate ethyl methacrylate was added to the flask and the addition reaction was continued at 80° C. for one hour while stirring, to produce Polyester macromer M-1 having a double bond at the end thereof and Mn of 500 and a hydroxyl value of 109.

TABLE 1

|  | Syn. Ex. 9 O-9 | Syn. Ex. 10 O-10 | Syn. Ex. 11 O-11 | Syn. Ex. 12 O-12 |
|---|---|---|---|---|
| Properties |  |  |  |  |
| Solid content | 30 | 30 | 30 | 47 |
| OH position | 33 | 26 | 26 | 19 |
| Mn | 8000 | 40000 | 24000 | 18000 |
| Mw | 60000 | 100000 | 90000 | 80000 |
| Amount of functional group (mole/kg-resin) |  |  |  |  |
| OH | 1.0 | 1.0 | 1.0 | 2.1 |
| Amount of chlorinated polyolefin used (%) | 24 | 24 | 24 | 13 |
| Feed material |  |  |  |  |
| Toluene | 495 | 495 | 465 | 390 |
| Hardrene 14 ML | 250 | 250 | 250 | 200 |
| Placcel FM-2 |  |  |  | 353 |
| Placcel FM-3 |  | 142 | 142 |  |
| Placcel FM-4 | 176 |  |  |  |
| Isobornyl methacrylate | 66 | 111 | 110 | 48 |
| Benzoyl peroxide | 10 | 1.2 | 2 | 6 |
| Azobisisobutyro nitrile | 4 | 0.6 | 2 | 4 |

|  | Syn. Ex. 13 O-13 | Syn. Ex. 14 O-14 | Syn. Ex. 15 O-15 | Syn. Ex. 16 O-16 |
|---|---|---|---|---|
| Properties |  |  |  |  |
| Solid content | 30 | 56 | 30 | 30 |
| OH position | 26 | 19 | 12 | 47 |
| Mn | 15000 | 20000 | 15000 | 16000 |
| Mw | 75000 | 85000 | 75000 | 75000 |
| Amount of functional group (mole/kg-resin) |  |  |  |  |
| OH | 0.5 | 2.7 | 1.0 | 0.8 |
| Amount of chlorinated polyolefin used (%) | 24 | 3 | 24 | 24 |
| Feed material |  |  |  |  |
| Toluene | 495 | 390 | 495 | 495 |
| Hardrene 14 ML | 250 | 48 | 250 | 250 |
| Placcel FM-1* |  |  | 73 |  |
| Placcel FM-2 |  | 538 |  |  |
| Placcel FM-3 | 71 |  |  |  |
| Monomer-A** |  |  |  | 195 |
| Isobornyl methacrylate | 122 | 15 | 100 | 51 |
| Styrene | 53 |  | 73 |  |
| n-Butyl acrylate | 18 |  |  |  |
| Benzoyl peroxide | 6 | 6 | 6 | 6 |
| Azobis isobutyro nitrile | 4 | 4 | 4 | 4 |

Note
*)Placcel FM-1 is a hydroxyl group-containing vinyl polymerizable monomer manufactured by Daisel Ltd. and represented by the following formula.

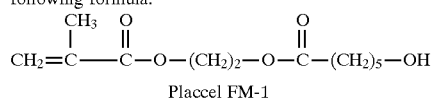

Placcel FM-1

**)Monomer A is a hydroxyl group-containing monomer represented by the following formula:

TABLE 1-continued

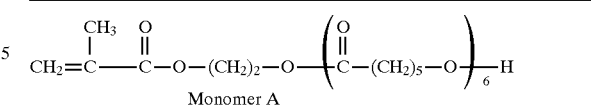

Monomer A

|  | Syn. Ex. 17 O-17 | Syn. Ex. 18 O-18 | Syn. Ex. 19 O-19 | Syn. Ex. 20 O-20 |
|---|---|---|---|---|
| Properties |  |  |  |  |
| Solid content | 30 | 30 | 30 | 30 |
| OH position | 33 | 33 | 22 | 26 |
| Mn | 4000 | 60000 | 16000 | 16000 |
| Mw | 40000 | 150000 | 75000 | 75000 |
| Amount of functional group (mole/kg-resin) |  |  |  |  |
| OH | 1.0 | 1.0 | 1.0 | 1.0 |
| Ca* |  | 0.5 |  |  |
| Ph** |  |  |  | 0.86 |
| Amount of chlorinated polyolefin used (%) | 24 | 24 | 24 | 24 |
| Feed material |  |  |  |  |
| Toluene | 495 | 495 | 495 | 495 |
| Hardrene 14 ML | 250 | 250 | 250 | 250 |
| Placcel FM-3 |  |  |  | 142 |
| Placcel FM-4 | 176 | 176 |  |  |
| Polyester macromer M-1 |  |  | 150 |  |
| Monomer B*** |  |  | 84 |  |
| Monomer C**** |  |  |  | 29 |
| Isobornyl methacrylate | 60 | 77 | 12 | 75 |
| Benzoyl peroxide | 12 | 0.8 | 6 | 6 |
| Azobis isobutyro nitrile | 8 | 0.3 | 4 | 4 |

Nore
*)Ca means a carboxyl group.
**)Ph means a phosphoric acid group.
* and **)Monomers B and C are monomers containing a carboxyl group or phosphoric acid group and represented by the following formulae.

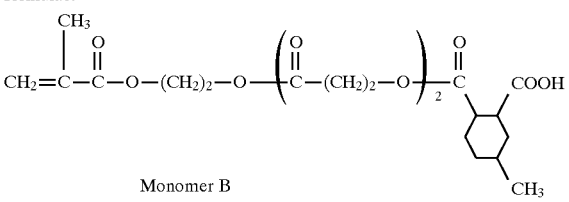

Monomer B

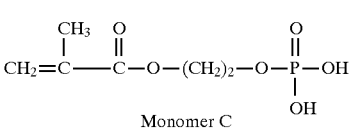

Monomer C

Monomer B is prepared by reacting one mole of Placcel FM-2 with one mole of 4-methylhexahydrophthalic anhydride. Monomer C is mono 2-methacryloyloxyethyl acid phosphate and is commercially available from Daihachi Kagaku Kogyo as MR-100.

TABLE 1
(continued)

|  | Syn. Ex. 21 O-21 | Syn. Ex. 22 O-22 | Syn. Ex. 23 O-23 |
|---|---|---|---|
| Properties |  |  |  |
| Solid content | 50 | 30 | 30 |
| OH position | 5 | 26 | 26 |
| Mn | 20000 | 15000 | 15000 |
| Mw | 85000 | 75000 | 75000 |
| Amount of functional group (mole/kg-resin) |  |  |  |
| OH | 0.9 | 0.4 | 0.35 |
| Amount of chlorinated polyolefin used (%) | 0 | 24 | 24 |
| Feed material |  |  |  |
| Toluene | 994 | 495 | 495 |
| Hardrene 14ML | 0 | 250 | 250 |
| Isobornyl methacrylate | 400 | 70 | 72 |

TABLE 1-continued
(continued)

|  | Syn. Ex. 21 O-21 | Syn. Ex. 22 O-22 | Syn. Ex. 23 O-23 |
|---|---|---|---|
| 2-Hydroxyethyl methacrylate |  | 20 | 20 |
| 2-Hydroxylethyl acrylate | 103 |  |  |
| Placcel FM-4 |  | 71 | 62 |
| n-Butyl acrylate | 106 | 18 | 25 |
| 2-Ethylhexyl methacrylate | 131 |  |  |
| Methyl methacrylate | 260 |  |  |
| Styrene |  | 67 | 67 |
| Benzoyl peroxide | 5 | 6 | 6 |
| Azobis isobutyro nitrile | 1 | 4 | 4 |

TABLE 2

|  | Syn. Ex. 24 B-1 | Syn. Ex. 25 B-2 | Syn. Ex. 26 B-3 | Syn. Ex. 27 B-4 |
|---|---|---|---|---|
| Properties |  |  |  |  |
| Solid content | 30 | 30 | 30 | 51 |
| BOH position* | 19 | 26 | 33 | 33 |
| Mn | 14000 | 15000 | 16000 | 16000 |
| Mw | 75000 | 75000 | 75000 | 75000 |
| Amount of functional group (mole/kg-resin) |  |  |  |  |
| BOH | 1.2 | 1.0 | 1.0 | 1.0 |
| Amount of chlorinated polyolefin used (%) | 24 | 24 | 24 | 9 |
| Feed material |  |  |  |  |
| Toluene | 495 | 495 | 495 | 385 |
| Hardrene 14ML | 250 | 250 | 250 | 200 |
| Monomer D** | 155 |  |  |  |
| Monomer F** |  | 163 |  |  |
| Monomer G** |  |  | 197 | 336 |
| Isobornyl methacrylate | 91 | 83 | 49 | 70 |
| Benzoyl peroxide | 6 | 6 | 6 | 6 |
| Azobis isobutyro nitrile | 4 | 4 | 4 | 4 |

Note *BOH means a blocked hydroxyl group.
**Monomers D, F and G are blocked hydroxyl group-containing monomers.

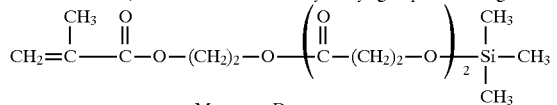

Monomer D

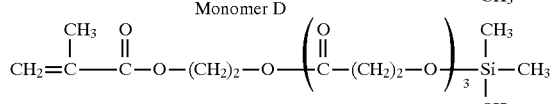

Monomer F

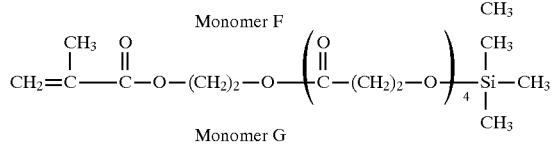

Monomer G

These monomers are prepared as follows:

Synthesis of Monomer D 300 parts of methylethylketone was introduced into a flask and 358 parts of Placcel FM-2 and 105 parts of triethylamine were added thereto and stirred at 10° C. Then, a mixture containing 107 parts of trimethylsilylchloride and 100 parts of methylethylketone was dropped to the flask at 60° C. and the reaction was conducted at 10° C. for 5 hrs. Then, the reaction mixture was washed three times with 500 parts of ice-water and Molecular sieve 4A1/16 manufactured by Wako Jun-Yaku was added thereto to dry it at room temperature for three days. Then, methylethylketone was distilled out by an evaporation to produce Monomer D.

Synthesis of Monomers F and G

The above procedure for Monomer D was repeated except that Placcel FM-3 or FM-4 was used, to produce Monomers F and G.

became 7 or lower. This procedure was repeated. Then, Molecular sieve 4A1/16 was added to the organic phase and dried at room temperature for three days and then methylethyl ketone was distilled out.

TABLE 2

| | Syn. Ex. 28 B-5 | Syn. Ex. 29 B-6 | Syn. Ex. 30 B-7 | Syn. Ex. 31 B-8 |
|---|---|---|---|---|
| Properties | | | | |
| Solid content | 33 | 50 | 30 | 30 |
| BOH position | 19 | 26 | 33 | 26 |
| Mn | 17000 | 16000 | 8000 | 31000 |
| Mw | 80000 | 80000 | 60000 | 95000 |
| Amount of functional group (mole/kg-resin) | | | | |
| BOH | 0.8 | 1.0 | 1.0 | 1.0 |
| Amount of chlorinated polyolefin used (%) | 49 | 0 | 24 | 24 |
| Feed material | | | | |
| Toluene | 293 | 500 | 495 | 495 |
| Hardrene 14ML | 540 | | 250 | 250 |
| Monomer E* | 113 | | | |
| Monomer F | | 272 | | 163 |
| Monomer G | | | 197 | |
| Isobornyl methacrylate | 45 | | 45 | 90 |
| Styrene | | 100 | | |
| n-Butyl methacrylate | | 58 | | |
| n-Butyl acrylate | | 50 | | |
| Benzoyl peroxide | 6 | 6 | 10 | 2 |
| Azobis isobutyro nitrile | 4 | 4 | 4 | 1 |

Note *Monomer E is a blocked hydroxyl group-containing monomer and represented by the following formyla:

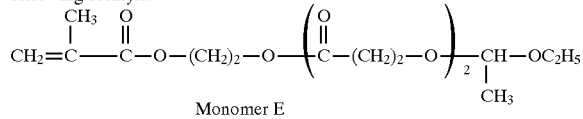

Monomer E

Monomer E was prepared by reacting one mole of ethylvinyl ether with one mole of Placcel FM-2. Specifically, this monomer is prepared as follows.

Into a flask, 0.5 part of 35% sulfuric acid, 358 parts of Placcel FM-2 and 600 parts of methylethylketone were introduced and heated at 50° C., followed by dropping 72 parts of ethylvinyl ether over 30 min. and reacting them at 50° C. for 24 hrs. Then, the flask was left to stand to be cooled. Then, the resultant mixture was diluted with 300 parts of methylethyl ketone and transferred to a separating funnel. The resultant product was washed with 200 parts of a 5% sodium hydrogen carbonate aqueous solution in the funnel and then washed with de-ionized water until the pH TABLE 2 (continued)

| | Syn. Ex. 32 B-9 | Syn. Ex. 33 B-10 | Syn. Ex. 34 B-11 |
|---|---|---|---|
| Properties | | | |
| Solid content | 30 | 47 | 30 |
| BOH position | 26 | 19 | 26 |
| Mn | 25000 | 17000 | 16000 |
| Mw | 90000 | 75000 | 75000 |
| Amount of functional group | | | |

TABLE 2-continued (continued)

| | Syn. Ex. 32 B-9 | Syn. Ex. 33 B-10 | Syn. Ex. 34 B-11 |
|---|---|---|---|
| (mole/kg-resin) | | | |
| BOH | 1.0 | 1.9 | 0.5 |
| Amount of chlorinated polyolefin used (%) | 24 | 13 | 24 |

TABLE 2-continued (continued)

| Feed material | Syn. Ex. 32<br>B-9 | Syn. Ex. 33<br>B-10 | Syn. Ex. 34<br>B-11 |
|---|---|---|---|
| Toluene | 495 | 390 | 495 |
| Hardrene 14ML | 250 | 200 | 250 |
| Monomer D |  | 383 |  |
| Monomer F | 163 |  | 82 |
| Isobornyl methacrylate | 89 | 18 | 100 |
| Styrene |  |  | 50 |
| n-Butyl methacrylate |  |  | 24 |
| Benzoyl peroxide | 2 | 6 | 6 |
| Azobis isobutyro nitrile | 2 | 4 | 4 |

Application Examples

Preparation of Coating Compositions

1. Preparation of solid color coating compositions

The solid color coating compositions (S series) were prepared based on the formulations described in Table 5 below.

2. Preparation of base coating compositions

The base coating compositions (BC series) were prepared based on the formulations described in Table 6 below.

3. Preparation of comparative coating compositions

The comparative coating compositions (H series) were prepared based on the formulations described in Table 7 below.

In this connection, the solid color coating compositions were prepared by adding titanium oxide to the coating resins and the melamine resin, dispersing them for 30 min. with Motor mill (manufactured by Igar Japan) and then adding thereto the remaining coating components.

The coating properties of the resultant coating compositions were evaluated by the following manners.

Evaluation of coating properties

1. Preparation of test pieces

Test pieces made of polyolefin resin (X50 manufactured by Mitsui Petrochemical Industries, Ltd.) were washed with isopropyl alcohol and then with petroleum benzine.

2. Coating of test pieces (1) Solid color coating compositions

The solid color coating compositions as prepared above were diluted with a thinner of xylene/butyl acetate (weight ratio of 60/40) so that the resultant solid color coating compositions had a Ford cup No. 4 viscosity of 16 seconds and coated on the test pieces by air spraying so that the dry thickness of the coated layer had 30 μm. After the coating was left to stand at room temperature for 10 min., the coating was dried at 120° C. for 30 min. or at 100° C. for 30 min. and then the properties thereof were evaluated 24 hrs. later.

(2) Base coating compositions

The base coating compositions as prepared above were diluted with a thinner of toluene/ethyl acetate (weight ratio of 60/40) so that the resultant coating compositions had a Ford cup No. 4 viscosity of 13 seconds and coated on the test pieces by air spraying so that the dry thickness of the coated layer had 15 μm. 5 min. after the coating of the base coating, the following clear coating compositions CR-1 and CR-2, which had been diluted with xylene so that the coating compositions had a Ford cup No. 4 viscosity of 16 seconds, were coated thereon so that the dry thickness of the coated layer had 30 μm. Then, the coating was dried at 120° C. for 30 min. or at 100° C. for 30 min. 24 hrs. later, the properties thereof were evaluated.

Preparation of clear coating compositions

1. Preparation of resins

The resins R-1 and 2 were synthesized based on the formulations below and in the same manner as the synthesis examples above. In this case, the reaction temperature was 140° C.

TABLE 3

| Formulation | R-1 | R-2 |
|---|---|---|
| Xylene | 300 | 300 |
| Lauryl methacrylate | 101 | 101 |
| Cyclohexyl methacrylate | 56 | 26 |
| n-Butyl acrylate | 10 | 10 |
| Styrene | 106 | 136 |
| Acrylic acid | 10 | 10 |
| Placcel FM-3 | 314 | 314 |
| Perbutyl-A | 3 | 3 |
| Perbutyl-O | 2 | 2 |
| Xylene | 30 | 30 |
| Perbutyl-A | 2 | 2 |
| Xylene | 10 | 10 |
| Solvesso 100 | 56 | 56 |

Note: Perbutyl-A is a peroxide manufactured by Nippon Oils & Fats Co., Ltd.

Solvesso 100 is a solvent manufactured by Exxon.

2. Preparation of clear coating compositions

The clear coating compositions CR-1 and CR-2 were prepared based on the formulations as described in Table 4 below.

TABLE 4

| Formulation | CR-1 | CR-2 |
|---|---|---|
| R-1 | 50 |  |
| R-2 |  | 50 |
| Superbeckamine L121-60 | 14 |  |
| Tinuvin 384 | 1 | 1 |
| Sanol SL292 | 0.5 | 0.5 |
| Aditol XL122 | 0.2 | 0.2 |
| P-198 | 2 |  |
| Xylol | 12 | 18 |
| Solvesso 100 | 20 | 20 |
| Burnock DN901S |  | 10 |

Note: Aditol XL122 is a surface controlling agent manufactured by Hoechst.

Burnock DN901S is an isocyanate prepolymer manufactured by Dainippon Ink & Chemicals, Ltd.

P-198 is a mixed ester of monobutyl phosphate and dibutyl phosphate (acid value: 400), manufactured by Dainippon Ink & Chemicals, Ltd.

Clear coating composition CR-1 was used in combination with Base coating compositions BC1–6, 15–24, 35–36, 38–47, 59–64 and Comparative coating compositions H15–24. On the other hand, Clear coating composition CR-2 was used in combination with Base coating compositions 7–14, 25–33, 36–37, 48–58 and Comparative coating compositions H25–26.

Evaluation of Coating Properties (1) Water resistance test

The part of the test piece was immersed in hot water at 50° C. for 10 days and then the piece was taken out and evaluated for adhesion and blistering. In the table, ○ means no peeling or blistering; Δ means there was some peeling or blistering; and X means that there was much peeling or blistering.

(2) Adhesion test

This test was conducted according to JIS K 5400(1979) 6.15. In the table, ○ means indication of no adhesion; Δ means that the part of the square cut portion was peeled; and X means that some of the square cut portions was peeled.

(3) weathering resistance test

The test piece is subjected to accelerated weathering test using Sunshine weatherometer (manufactured by Suga Testor) and the gross maintaining proportion (%) was determined after 1000 hr test in accordance with JIS K 5400 (1979) concerning 60 degree mirror gross. Also, the adhesion test was conducted in accordance with JIS K 5400 (1976) 6.15. In the tables, ○ means that the gloss maintaining proportion is 80% or higher and the adhesion property is good; Δ means that the gloss maintaining proportion is 70% or higher and less than 80% and the adhesion property is good; and X means that the gloss maintaining proportion is less than 70% and the coating was peeled.

(4) Gasoline resistance test

The part of the test piece was immersed in regular gasoline (Nisseki silver) at 20° C. The test piece was taken out and the swelling was observed. In the tables, ○ means no change; Δ means that the coating is little swelled; and X means that the coating was much swelled.

(5) Solid content

The lower the solid content, it is more difficult to make the coating thickness larger.

As for Solid color coating compositions, ○ means the solid content of more than 15%; and X means the solid content of 15% or lower.

As for Metallic base coating compositions, ○ means the solid content of more than 10%; and X means the solid content of 10% or lower.

TABLE 5

| | Solid color coating compositions | | | | | | | | | |
|---|---|---|---|---|---|---|---|---|---|---|
| | S 1 | S 2 | S 3 | S 4 | S 5 | S 6 | S 7 | S 8 | S 9 | S 10 |
| Formulation | | | | | | | | | | |
| O - 1 | 166 | | | | | | | 82 | 82 | |
| O - 2 | | 166 | | | | | | | | |
| O - 3 | | | 166 | | | | | | | |
| O - 4 | | | | 98 | | | | | | |
| O - 5 | | | | | 152 | | | | | |
| O - 6 | | | | | | 166 | | | | |
| O - 7 | | | | | | | 50 | | | |
| O - 8 | | | | | | | | 50 | | |
| O - 9 | | | | | | | | | 166 | |
| O - 10 | | | | | | | | | | 166 |
| Superbeckamine | | | | | | | | | | |
| L-121-60 | 33 | 33 | 33 | 33 | 33 | 33 | 33 | 33 | 33 | 33 |
| P-198 | 6 | 6 | 6 | 6 | 6 | 6 | 6 | 6 | 6 | 6 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Typaque CR-95 | 50 | 50 | 50 | 50 | 50 | 50 | 50 | 50 | 50 | 50 |
| Modaflow | 0.3 | 0.3 | 0.3 | 0.3 | 0.3 | 0.3 | 0.3 | 0.3 | 0.3 | 0.3 |
| Properties | | | | | | | | | | |
| Cont. of CP[*1] | 24 | 24 | 24 | 9 | 49 | 24 | 14 | 12 | 24 | 24 |
| Posi. of OH[*2] | 19 | 26 | 33 | 33 | 33 | 22 | 19/22 | 19/24 | 33 | 26 |
| Mn[*3] ($\times 10^3$) | 15 | 15 | 15 | 18 | 16 | 16 | 15/16 | 15/19 | 8 | 40 |
| Mw[*3] ($\times 10^3$) | 75 | 75 | 75 | 80 | 75 | 75 | 75/75 | 75/75 | 60 | 100 |
| Amo. of OH[*4] | 1.2 | 1.0 | 1.0 | 1.0 | 0.9 | 1.0 | 1.2/1.0 | 1.2/1.0 | 1.0 | 1.0 |
| Mn[*5] ($\times 10^2$) | 15 | 15 | 15 | 15 | 15 | 15 | 15 | 15 | 15 | 15 |
| Mw[*5] ($\times 10^2$) | 41 | 41 | 41 | 41 | 41 | 41 | 41 | 41 | 41 | 41 |
| RR[*6] | 71/29 | 71/29 | 71/29 | 71/29 | 71/29 | 71/29 | 71/29 | 71/29 | 71/29 | 71/29 |
| TAV[*7] | 32 | 32 | 32 | 32 | 32 | 32 | 32 | 32 | 32 | 32 |
| Performance | | | | | | | | | | |
| 120° C., 30 min. | | | | | | | | | | |
| Adhesion | ○ | ○ | ○ | ○ | ○ | ○ | ○ | ○ | ○ | ○ |
| Wat. res.[*8] | ○ | ○ | ○ | Δ | ○ | ○ | ○ | ○ | ○ | ○ |
| Gross[*9] | 82 | 80 | 85 | 87 | 73 | 82 | 86 | 85 | 83 | 84 |

TABLE 5-continued

|  | | | | | | | | | |
|---|---|---|---|---|---|---|---|---|---|
| Gas. res.*10 | ○ | ○ | ○ | ○ | Δ | ○ | ○ | ○ | ○ | ○ |
| Wea. res.*11 | ○ | ○ | ○ | ○ | Δ | ○ | ○ | ○ | ○ | ○ |
| 100° C., 30 min. | | | | | | | | | | |
| Adhesion | ○ | ○ | ○ | ○ | ○ | ○ | ○ | ○ | ○ | ○ |
| Wat. res. | ○ | ○ | ○ | Δ | ○ | ○ | ○ | ○ | ○ | ○ |
| Gross | 81 | 82 | 83 | 85 | 75 | 80 | 85 | 84 | 80 | 83 |
| Gas. res. | Δ | ○ | ○ | ○ | Δ | ○ | Δ | Δ | ○ | ○ |
| Wea. res. | ○ | ○ | ○ | Δ | ○ | ○ | ○ | ○ | ○ | ○ |
| Solid cont. | ○ | ○ | ○ | ○ | ○ | ○ | ○ | ○ | ○ | ○ |

|  | Solid color coating compositions | | | | | | | | | |
|---|---|---|---|---|---|---|---|---|---|---|
|  | S 11 | S 12 | S 13 | S 14 | S 15 | S 16 | S 17 | S 18 | S 19 | S 20 |
| Formulation | | | | | | | | | | |
| O - 2 | | | | | 166 | 166 | 110 | 166 | 166 | 166 |
| O - 11 | 166 | | | | | | | | | |
| O - 12 | | 106 | | | | | | | | |
| O - 19 | | | 166 | | | | | | | |
| O - 20 | | | | 166 | | | | | | |
| Superbeckamine | | | | | | | | | | |
| L-121-60 | 33 | 33 | 33 | 33 | 25 | 17 | 55 | | | |
| Uvan 22R | | | | | | | | 40 | | |
| Uvan 21R | | | | | | | | | 40 | |
| Uvan 2028 | | | | | | | | | | 27 |
| P-198 | 6 | 6 | 6 | 6 | 5 | 5 | 6 | 6 | 6 | 6 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Typaque CR-95 | 50 | 50 | 50 | 50 | 50 | 50 | 50 | 50 | 50 | 50 |
| Modaflow | 0.3 | 0.3 | 0.3 | 0.3 | 0.3 | 0.3 | 0.3 | 0.3 | 0.3 | 0.3 |
| Properties | | | | | | | | | | |
| Con. of CP | 24 | 13 | 24 | 24 | 24 | 24 | 24 | 24 | 24 | 24 |
| Posi. of OH | 26 | 19 | 22 | 26 | 26 | 26 | 26 | 26 | 26 | 26 |
| Mn*3 (×10$^3$) | 24 | 18 | 16 | 16 | 15 | 15 | 15 | 15 | 15 | 15 |
| Mw*3 (×10$^3$) | 90 | 80 | 75 | 75 | 75 | 75 | 75 | 75 | 75 | 75 |
| Amo. of OH | 1.0 | 2.1 | 1.0 | 1.0 | 1.0 | 1.0 | 1.0 | 1.0 | 1.0 | 1.0 |
| Mn*5 (×10$^2$) | 15 | 15 | 15 | 15 | 15 | 15 | 15 | 18 | 20 | 10 |
| Mw*5 (×10$^2$) | 41 | 41 | 41 | 41 | 41 | 41 | 41 | 70 | 110 | 15 |
| RR | 71/29 | 71/29 | 71/29 | 71/29 | 77/23 | 83/17 | 50/50 | 71/29 | 71/29 | 71/29 |
| TAV | 32 | 32 | 32 | 32 | 29 | 29 | 33 | 32 | 32 | 32 |
| Performance | | | | | | | | | | |
| 120° C., 30 min. | | | | | | | | | | |
| Adhesion | ○ | ○ | ○ | ○ | ○ | ○ | ○ | ○ | ○ | ○ |
| Wat. res. | ○ | ○ | ○ | ○ | ○ | ○ | ○ | ○ | ○ | ○ |
| Gross | 83 | 88 | 82 | 84 | 85 | 86 | 85 | 84 | 83 | 86 |
| Gas. res. | ○ | ○ | ○ | ○ | ○ | ○ | ○ | ○ | ○ | ○ |
| Wea. res. | ○ | ○ | ○ | ○ | ○ | ○ | ○ | ○ | ○ | ○ |
| 100° C., 30 min. | | | | | | | | | | |
| Adhesion | ○ | ○ | ○ | ○ | ○ | ○ | ○ | ○ | ○ | ○ |
| Wat. res. | ○ | Δ | ○ | ○ | ○ | ○ | ○ | ○ | ○ | ○ |
| Gross | 82 | 86 | 80 | 83 | 84 | 83 | 80 | 82 | 80 | 85 |
| Gas. res. | ○ | ○ | ○ | ○ | ○ | Δ | Δ | ○ | ○ | ○ |
| Wea. res. | ○ | ○ | ○ | ○ | ○ | ○ | ○ | ○ | ○ | ○ |
| Solid cont. | ○ | ○ | ○ | ○ | ○ | ○ | ○ | ○ | ○ | ○ |

|  | Solid color coating compositions | | | | | | | | | |
|---|---|---|---|---|---|---|---|---|---|---|
|  | S 21 | S 22 | S 23 | S 24 | S 25 | S 26 | S 27 | S 28 | S 29 | S 30 |
| Formulation | | | | | | | | | | |
| O - 1 | 166 | | | | | | | | | |
| O - 19 | | 166 | 166 | 166 | | | | | | |
| O - 20 | | | | | 166 | 166 | 166 | 166 | 166 | 166 |
| Superbeckamine | | | | | | | | | | |
| L-121-60 | | | | | | | | 16 | 33 | 33 |

TABLE 5-continued

| | | | | | | | | | | |
|---|---|---|---|---|---|---|---|---|---|---|
| Uvan 22R | | 40 | | | 40 | | 20 | | | |
| Uvan 21R | | | 40 | | | 40 | | | | |
| Uvan 60R | 40 | | | 40 | | | 40 | | | |
| P-198 | 7 | | | | | | | 6 | 1 | 2 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Typaque CR-95 | 50 | 50 | 50 | 50 | 50 | 50 | 50 | 50 | 50 | 50 |
| Modaflow | 0.3 | 0.3 | 0.3 | 0.3 | 0.3 | 0.3 | 0.3 | 0.3 | 0.3 | 0.3 |

Properties

| | | | | | | | | | | |
|---|---|---|---|---|---|---|---|---|---|---|
| Cont. of CP | 24 | 24 | 24 | 24 | 24 | 24 | 24 | 24 | 24 | 24 |
| Posi. of OH | 26 | 22 | 22 | 22 | 26 | 26 | 26 | 26 | 26 | 26 |
| Mn*3 (×10³) | 15 | 16 | 16 | 16 | 16 | 16 | 16 | 16 | 16 | 16 |
| Mw*3 (×10³) | 75 | 75 | 75 | 75 | 75 | 75 | 75 | 75 | 75 | 75 |
| Amo. of OH | 1.0 | 1.0 | 1.0 | 1.0 | 1.0 | 1.0 | 1.0 | 1.0 | 1.0 | 1.0 |
| Mn*5 (×10²) | 18 | 18 | 20 | 18 | 18 | 20 | 18 | 15/18 | 15 | 15 |
| Mw*5 (×10²) | 70 | 70 | 110 | 70 | 70 | 110 | 70 | 41/70 | 41 | 41 |
| RR | 71/29 | 71/29 | 71/29 | 71/29 | 71/29 | 71/29 | 71/29 | 71/29 | 71/29 | 71/29 |
| TAV | 27 | 21 | 21 | 21 | 21 | 21 | 21 | 32 | 27 | 32 |

Performance

120° C., 30 min.

| | | | | | | | | | | |
|---|---|---|---|---|---|---|---|---|---|---|
| Adhesion | ◯ | ◯ | ◯ | ◯ | ◯ | ◯ | ◯ | ◯ | ◯ | ◯ |
| Wat. res. | Δ | ◯ | ◯ | ◯ | ◯ | ◯ | ◯ | ◯ | ◯ | ◯ |
| Gross | 84 | 82 | 80 | 83 | 88 | 86 | 83 | 81 | 84 | 83 |
| Gas. res. | ◯ | ◯ | ◯ | ◯ | ◯ | ◯ | ◯ | ◯ | ◯ | ◯ |
| Wea. res. | ◯ | ◯ | ◯ | ◯ | ◯ | ◯ | ◯ | ◯ | ◯ | ◯ |

100° C., 30 min.

| | | | | | | | | | | |
|---|---|---|---|---|---|---|---|---|---|---|
| Adhesion | ◯ | ◯ | ◯ | ◯ | ◯ | ◯ | ◯ | ◯ | ◯ | ◯ |
| Wat. res. | Δ | ◯ | ◯ | ◯ | ◯ | ◯ | ◯ | ◯ | ◯ | ◯ |
| Gross | 83 | 81 | 86 | 84 | 85 | 84 | 82 | 80 | 83 | 80 |
| Gas. res. | ◯ | ◯ | ◯ | ◯ | ◯ | ◯ | ◯ | ◯ | ◯ | ◯ |
| Wea. res. | ◯ | ◯ | ◯ | ◯ | ◯ | ◯ | ◯ | ◯ | ◯ | ◯ |
| Solid cont. | ◯ | ◯ | ◯ | ◯ | ◯ | ◯ | ◯ | ◯ | ◯ | ◯ |

| | Solid color coating compositions | | | | | | |
|---|---|---|---|---|---|---|---|
| | S 31 | S 32 | S 33 | S 34 | S 35 | S 36 | S 37 |

Formulation

| | | | | | | | |
|---|---|---|---|---|---|---|---|
| O - 1 | | 166 | 166 | 133 | 133 | 110 | 110 |
| O - 20 | 166 | | | | | | |

Superbeckamine

| | | | | | | | |
|---|---|---|---|---|---|---|---|
| L-121-60 | 33 | 33 | 33 | 33 | 33 | 33 | 33 |
| P-198 | 3 | 3 | 9 | 6 | 3 | 6 | 3 |
| Butyl acetate | 10 | 10 | 10 | 10 | 10 | 10 | 10 |
| Xylene | 10 | 10 | 10 | 10 | 10 | 10 | 10 |
| Tinuvin 384 | 2 | 2 | 2 | 2 | 2 | 2 | 2 |
| Sanol LS292 | 1 | 1 | 1 | 1 | 1 | 1 | 1 |
| Typaque CR-95 | 50 | 50 | 50 | 50 | 50 | 50 | 50 |
| Modaflow | 0.3 | 0.3 | 0.3 | 0.3 | 0.3 | 0.3 | 0.3 |
| Hardrene 15LLB | | | | 33 | 33 | | |
| Superchlon 822 | | | | | | 40 | 40 |

Properties

| | | | | | | | |
|---|---|---|---|---|---|---|---|
| Cont. of CP | 24 | 24 | 24 | 25 | 25 | 24 | 24 |
| Posi. of OH | 26 | 26 | 26 | 26 | 26 | 26 | 26 |
| Mn*3 (×10³) | 16 | 15 | 15 | 15 | 15 | 15 | 15 |
| Mw*3 (×10³) | 75 | 75 | 75 | 75 | 75 | 75 | 75 |
| Amo. of OH | 1.0 | 1.0 | 1.0 | 0.8 | 0.8 | 0.8 | 0.8 |
| Mn*5 (×10²) | 15 | 15 | 15 | 15 | 15 | 15 | 15 |
| Mw*5 (×10²) | 41 | 41 | 41 | 41 | 41 | 41 | 41 |
| RR | 71/29 | 71/29 | 71/29 | 71/29 | 71/29 | 71/29 | 71/29 |
| TAV | 37 | 17 | 46 | 32 | 17 | 32 | 17 |

TABLE 5-continued

| Performance | | | | | | | |
|---|---|---|---|---|---|---|---|
| 120° C., 30 min. | | | | | | | |
| Adhesion | ○ | ○ | ○ | ○ | ○ | ○ | ○ |
| Wat. res. | ○ | ○ | ○ | ○ | ○ | ○ | ○ |
| Gross | 80 | 85 | 84 | 83 | 82 | 83 | 84 |
| Gas. res. | ○ | ○ | ○ | ○ | Δ | ○ | Δ |
| Wea. res. | ○ | ○ | ○ | ○ | ○ | ○ | ○ |
| 100° C., 30 min. | | | | | | | |
| Adhesion | ○ | ○ | ○ | ○ | ○ | ○ | ○ |
| Wat. res. | ○ | ○ | Δ | ○ | ○ | ○ | ○ |
| Gross | 82 | 81 | 84 | 83 | 84 | 82 | 81 |
| Gas. res. | ○ | Δ | ○ | ○ | Δ | ○ | Δ |
| Wea. res. | ○ | ○ | ○ | ○ | ○ | ○ | ○ |
| Solid cont. | ○ | ○ | ○ | ○ | ○ | ○ | ○ |

|  | Solid color coating compositions | | | | | | | | |
|---|---|---|---|---|---|---|---|---|---|
|  | S 38 | S 39 | S 40 | S 41 | S 42 | S 43 | S 44 | S 45 | S 46 | S 47 |
| Formulation | | | | | | | | | | |
| B - 1 | 166 | | | | | 83 | | | | |
| B - 2 | | 166 | | | | | | | | |
| B - 3 | | | 166 | | | | | | | |
| B - 4 | | | | 98 | | | | | | |
| B - 5 | | | | | 152 | | | | | |
| B - 6 | | | | | | 50 | | | | |
| B - 7 | | | | | | | 166 | | | |
| B - 8 | | | | | | | | 166 | | |
| B - 9 | | | | | | | | | 166 | |
| B - 10 | | | | | | | | | | 106 |
| Superbeckamine | | | | | | | | | | |
| L-121-60 | 33 | 33 | 33 | 33 | 33 | 33 | 33 | 33 | 33 | 33 |
| P-198 | 6 | 6 | 6 | 6 | 6 | 6 | 6 | 6 | 6 | 6 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Typeque CR-95 | 50 | 50 | 50 | 50 | 50 | 50 | 50 | 50 | 50 | 50 |
| Modaflow | 0.3 | 0.3 | 0.3 | 0.3 | 0.3 | 0.3 | 0.3 | 0.3 | 0.3 | 0.3 |
| Properties | | | | | | | | | | |
| Cont. of CP | 24 | 24 | 24 | 9 | 49 | 12 | 24 | 24 | 24 | 24 |
| Posi. of OH | 19 | 26 | 33 | 33 | 19 | 19/26 | 33 | 26 | 26 | 26 |
| $Mn^{*3}$ (×10$^3$) | 14 | 15 | 16 | 16 | 17 | 14/16 | 8 | 31 | 25 | 17 |
| $Mw^{*3}$ (×10$^3$) | 75 | 75 | 75 | 75 | 80 | 75/80 | 60 | 95 | 90 | 75 |
| Amo. of OH | 1.2 | 1.0 | 1.0 | 1.0 | 0.8 | 1.2/1.0 | 1.0 | 1.0 | 1.0 | 1.9 |
| $Mn^{*5}$ (×10$^2$) | 15 | 15 | 15 | 15 | 15 | 15 | 15 | 15 | 15 | 15 |
| $Mw^{*5}$ (×10$^2$) | 41 | 41 | 41 | 41 | 41 | 41 | 41 | 41 | 41 | 41 |
| RR | 71/29 | 71/29 | 71/29 | 71/29 | 71/29 | 71/29 | 71/29 | 71/29 | 71/29 | 71/29 |
| TAV | 32 | 32 | 32 | 32 | 32 | 32 | 32 | 32 | 32 | 32 |
| Performance | | | | | | | | | | |
| 120° C., 30 min. | | | | | | | | | | |
| Adhesion | ○ | ○ | ○ | ○ | ○ | ○ | ○ | ○ | ○ | ○ |
| Wat. res. | ○ | ○ | Δ | ○ | ○ | ○ | ○ | ○ | ○ | ○ |
| Gross | 84 | 83 | 86 | 83 | 76 | 80 | 84 | 85 | 83 | 81 |
| Gas. res. | ○ | ○ | ○ | ○ | Δ | ○ | ○ | ○ | ○ | ○ |
| Wea. res. | ○ | ○ | ○ | ○ | Δ | ○ | ○ | ○ | ○ | ○ |
| 100° C., 30 min. | | | | | | | | | | |
| Adhesion | ○ | ○ | ○ | ○ | ○ | ○ | ○ | ○ | ○ | ○ |
| Wat. res. | ○ | ○ | ○ | Δ | ○ | ○ | ○ | ○ | ○ | ○ |
| Gross | 83 | 85 | 81 | 84 | 74 | 81 | 84 | 88 | 85 | 82 |
| Gas. res. | Δ | ○ | ○ | ○ | Δ | ○ | ○ | ○ | ○ | Δ |
| Wea. res. | ○ | ○ | ○ | ○ | Δ | ○ | ○ | ○ | ○ | ○ |
| Solid cont. | ○ | ○ | ○ | ○ | ○ | ○ | ○ | ○ | ○ | ○ |

TABLE 5-continued

| | Solid color coating compositions | | | | | | |
|---|---|---|---|---|---|---|---|
| | S 48 | S 49 | S 50 | S 51 | S 52 | S 53 | S 54 |
| Formulation | | | | | | | |
| B - 1 | | | | | | | 83 |
| B - 2 | 166 | 166 | 166 | 166 | 166 | 166 | |
| O - 1 | | | | | | | 83 |
| Superbeckamine | | | | | | | |
| L-121-60 | 25 | 17 | 55 | | | | 33 |
| Uvan 22R | | | | 40 | | | |
| Uvan 2028 | | | | | 27 | | |
| Uvan 60R | | | | | | 40 | |
| Paratoluene sulfonic acid | | | | | | 7 | |
| P-198 | 5 | 5 | 6 | 6 | 6 | | 6 |
| Butyl acetate | 10 | 10 | 10 | 10 | 10 | 10 | 10 |
| Xylene | 10 | 10 | 10 | 10 | 10 | 10 | 10 |
| Tinuvin 384 | 2 | 2 | 2 | 2 | 2 | 2 | 2 |
| Sanol LS292 | 1 | 1 | 1 | 1 | 1 | 1 | 1 |
| Typaque CR-95 | 50 | 50 | 50 | 50 | 50 | 50 | 50 |
| Modaflow | 0.3 | 0.3 | 0.3 | 0.3 | 0.3 | 0.3 | 0.3 |
| Properties | | | | | | | |
| Cont. of CP | 24 | 24 | 24 | 24 | 24 | 24 | 24 |
| Posi. of OH | 26 | 26 | 26 | 26 | 26 | 26 | 19 |
| $Mn^{*3}$ $(\times 10^3)$ | 15 | 15 | 15 | 15 | 15 | 15 | 14/15 |
| $Mw^{*3}$ $(\times 10^3)$ | 75 | 75 | 75 | 75 | 75 | 75 | 75/75 |
| Amo. of OH | 1.0 | 1.0 | 1.0 | 1.0 | 1.0 | 1.0 | 1.2 |
| $Mn^{*5}$ $(\times 10^2)$ | 15 | 15 | 15 | 18 | 10 | 18 | 15 |
| $Mw^{*5}$ $(\times 10^2)$ | 41 | 41 | 41 | 70 | 15 | 70 | 41 |
| RR | 77/23 | 83/17 | 50/50 | 71/29 | 71/29 | 71/29 | 71/29 |
| TAV | 29 | 29 | 33 | 32 | 32 | 27 | 32 |
| Performance | | | | | | | |
| 120° C., 30 min. | | | | | | | |
| Adhesion | ○ | ○ | ○ | ○ | ○ | ○ | ○ |
| Wat. res. | ○ | ○ | ○ | ○ | ○ | Δ | ○ |
| Cross | 80 | 83 | 85 | 83 | 83 | 80 | 84 |
| Gas. res. | ○ | ○ | ○ | ○ | ○ | ○ | ○ |
| Wea. res. | ○ | ○ | ○ | ○ | ○ | ○ | ○ |
| 100° C., 30 min. | | | | | | | |
| Adhesion | ○ | ○ | ○ | ○ | ○ | ○ | ○ |
| Wat. res. | ○ | ○ | ○ | ○ | ○ | Δ | ○ |
| Gross | 83 | 82 | 81 | 83 | 85 | 83 | 84 |
| Gas. res. | ○ | Δ | Δ | ○ | ○ | ○ | ○ |
| Wea. res. | ○ | ○ | ○ | ○ | ○ | ○ | ○ |
| Solid cont. | ○ | ○ | ○ | ○ | ○ | ○ | ○ |

| | Solid color coating compositions | | | | | | | | | |
|---|---|---|---|---|---|---|---|---|---|---|
| | S 55 | S 56 | S 57 | S 58 | S 59 | S 60 | S 61 | S 62 | S 63 | S 64 |
| Formulation | | | | | | | | | | |
| B - 2 | 83 | | 166 | 166 | 166 | | | 166 | | |
| B - 11 | | | | | | | 166 | | | |
| O - 2 | 83 | 83 | | | | | | | | |
| O - 13 | | | | | | | | | 166 | 166 |
| O - 19 | | 83 | | | | | | | | |
| O - 22 | | | | | | 166 | | | | |
| Superbeckamine | | | | | | | | | | |
| L-121-60 | 33 | 33 | 33 | 33 | | | | | | |
| Uvan 21R | | | | | 40 | 40 | 40 | 40 | 40 | 40 |
| P-198 | 6 | 3 | 3 | 9 | 6 | 6 | 6 | 2 | 2 | 2 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |

TABLE 5-continued

| | | | | | | | | | | |
|---|---|---|---|---|---|---|---|---|---|---|
| Typaque CR-95 | 50 | 50 | 50 | 50 | 50 | 50 | 50 | 50 | 50 | 50 |
| Modaflow | 0.3 | 0.3 | 0.3 | 0.3 | 0.3 | 0.3 | 0.3 | 0.3 | 0.3 | 0.3 |
| Properties | | | | | | | | | | |
| Cont. of CP | 24 | 24 | 24 | 24 | 24 | 24 | 24 | 24 | 24 | 24 |
| Posi. of OH | 26 | 26 | 26 | 26 | 26 | 26 | 26 | 26 | 26 | 26 |
| $Mn^{*3}$ (×10$^3$) | 15 | 15/18 | 15 | 15 | 15 | 15 | 16 | 15 | 15 | 15 |
| $Mw^{*3}$ (×10$^3$) | 75 | 75/75 | 75 | 75 | 75 | 75 | 75 | 75 | 75 | 75 |
| Amo. of OH | 1.0 | 1.0 | 1.0 | 1.0 | 0.5 | 0.5 | 0.5 | 0.5 | 1.0 | 1.0 |
| $Mn^{*5}$ (×10$^2$) | 15 | 15 | 15 | 15 | 20 | 20 | 20 | 20 | 20 | 20 |
| $Mw^{*5}$ (×10$^2$) | 41 | 41 | 41 | 41 | 110 | 110 | 110 | 110 | 110 | 110 |
| RR | 71/29 | 71/29 | 71/29 | 71/29 | 71/29 | 71/29 | 71/29 | 71/29 | 71/29 | 71/29 |
| TAV | 32 | 27 | 17 | 46 | 32 | 32 | 32 | 11 | 11 | 6 |
| Performance | | | | | | | | | | |
| 120° C., 30 min. | | | | | | | | | | |
| Adhesion | ○ | ○ | ○ | ○ | ○ | ○ | ○ | ○ | ○ | ○ |
| Wat. res. | ○ | ○ | ○ | ○ | ○ | ○ | ○ | ○ | ○ | ○ |
| Gross | 83 | 82 | 84 | 80 | 85 | 84 | 86 | 85 | 86 | 85 |
| Gas. res. | ○ | ○ | ○ | ○ | ○ | ○ | ○ | ○ | ○ | ○ |
| Wea. res. | ○ | ○ | ○ | ○ | ○ | ○ | ○ | ○ | ○ | ○ |
| 100° C., 30 min. | | | | | | | | | | |
| Adhesion | ○ | ○ | ○ | ○ | ○ | ○ | ○ | ○ | ○ | ○ |
| Wat. res. | ○ | ○ | ○ | Δ | Δ | ○ | ○ | ○ | ○ | Δ |
| Gross | 85 | 84 | 83 | 84 | 82 | 81 | 83 | 83 | 84 | 83 |
| Gas. res. | ○ | ○ | Δ | ○ | Δ | ○ | ○ | ○ | ○ | Δ |
| Wea. res. | ○ | ○ | ○ | ○ | ○ | ○ | ○ | ○ | ○ | ○ |
| Solid cont. | ○ | ○ | ○ | ○ | ○ | ○ | ○ | ○ | ○ | ○ |

Note
*$^1$) "Cont. of CP" means the content of chlorinated polyolefin.
*$^2$) "Posi. of OH" means the position of a hydroxyl group. The OH position means the position of a primary hydroxyl group expressed as the number of atoms between the hydroxyl group and the vinyl graft polymer main chain of the grafted and chlorinated polyolefin oligomer.
*$^3$) Mn and Mw mean those of the grafted and chlorinated polyolefin oligomers.
*$^4$) "Amo. of OH" means the amount of a hydroxyl group in respect of mole/kg-resin.
*$^5$) Mn and Mw mean those of the melamine resins.
*$^6$) "RR" means the resin ratio of the grafted and chlorinated polyolefin oligomer/the melamine resin.
*$^7$) "TAV" means the total acid value.
*$^8$) "Wat. res." means water resistance.
*$^9$) "Gross" means gloss maintaining proportion.
*$^{10}$) "Gas. res." means gasoline resistance.
*$^{11}$) "Wea. res." means weathering resistance.
*$^{12}$) "Solid cont." means solid content.

TABLE 6

| | Base coating compositions | | | | | | | | | |
|---|---|---|---|---|---|---|---|---|---|---|
| | BC1 | BC2 | BC3 | BC4 | BC5 | BC6 | BC7 | BC8 | BC9 | BC10 |
| Formulation | | | | | | | | | | |
| O-1 | 166 | | | | | | | | | |
| O-2 | | 166 | | | | | | | | |
| O-3 | | | 166 | | | | | | | |
| O-4 | | | | 98 | | | | | | |
| O-5 | | | | | 152 | | | | | |
| O-6 | | | | | | 166 | | | | |
| O-7 | | | | | | | 50 | | | |
| O-8 | | | | | | | | 50 | | |
| O-9 | | | | | | | | | 166 | |
| O-10 | | | | | | | | | | 166 |
| Superbeckamine L-121-60 | 33 | 33 | 33 | 33 | 33 | 33 | 33 | 33 | 33 | 33 |
| P-198 | 6 | 6 | 6 | 6 | 6 | 6 | 6 | 6 | 6 | 6 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Aluminum paste | 10 | 10 | 10 | 10 | 10 | 10 | 10 | 10 | 10 | 10 |

TABLE 6-continued

| Modaflow | 0.3 | 0.3 | 0.3 | 0.3 | 0.3 | 0.3 | 0.3 | 0.3 | 0.3 | 0.3 |
|---|---|---|---|---|---|---|---|---|---|---|
| Properties | | | | | | | | | | |
| Cont. of CP | 24 | 24 | 24 | 9 | 49 | 24 | 14 | 12 | 24 | 24 |
| Posi. of OH | 19 | 26 | 33 | 33 | 33 | 22 | 19/22 | 19/24 | 33 | 26 |
| Mn *3 (× 10²) | 15 | 15 | 15 | 18 | 16 | 16 | 15/19 | 15/16 | 8 | 40 |
| Mw *3 (× 10³) | 75 | 75 | 75 | 80 | 75 | 75 | 75/80 | 75/75 | 60 | 100 |
| Amo. of OH | 1.2 | 1.0 | 1.0 | 1.0 | 0.9 | 1.0 | 1.2/1.0 | 1.2/1.0 | 1.0 | 1.0 |
| Mn *5 (× 10²) | 15 | 15 | 15 | 15 | 15 | 15 | 15 | 15 | 15 | 15 |
| Mw *5 (× 10²) | 41 | 41 | 41 | 41 | 41 | 41 | 41 | 41 | 41 | 41 |
| RR | 71/29 | 71/29 | 71/29 | 71/29 | 71/29 | 71/29 | 71/29 | 71/29 | 71/29 | 71/29 |
| TAV | 32 | 32 | 32 | 32 | 32 | 32 | 32 | 32 | 32 | 32 |
| Performance | | | | | | | | | | |
| 120° C., 30 min. | | | | | | | | | | |
| Adhesion | ○ | ○ | ○ | ○ | ○ | ○ | ○ | ○ | ○ | ○ |
| Wat. res. | ○ | ○ | ○ | Δ | ○ | ○ | ○ | ○ | ○ | ○ |
| Gross | 88 | 87 | 92 | 94 | 92 | 90 | 93 | 90 | 88 | 90 |
| Gas. res. | ○ | ○ | ○ | ○ | ○ | ○ | ○ | ○ | ○ | ○ |
| Wea. res. | ○ | ○ | ○ | ○ | ○ | ○ | ○ | ○ | ○ | ○ |
| 100° C., 30 min. | | | | | | | | | | |
| Adhesion | ○ | ○ | ○ | ○ | ○ | ○ | ○ | ○ | ○ | ○ |
| Wat. res. | ○ | ○ | ○ | Δ | ○ | ○ | ○ | ○ | ○ | ○ |
| Gross | 84 | 89 | 91 | 92 | 90 | 93 | 91 | 90 | 93 | 91 |
| Gas. res. | ○ | ○ | ○ | ○ | Δ | ○ | ○ | ○ | ○ | ○ |
| Wea. res. | ○ | ○ | ○ | ○ | Δ | ○ | ○ | ○ | ○ | ○ |
| Solid cont. | ○ | ○ | ○ | ○ | ○ | ○ | ○ | ○ | ○ | 0 |

| | Base coating compositions | | | | | | | | | |
|---|---|---|---|---|---|---|---|---|---|---|
| | BC11 | BC12 | BC13 | BC14 | BC15 | BC16 | BC17 | BC18 | BC19 | BC20 |
| Formulation | | | | | | | | | | |
| O-2 | | | | | 166 | 166 | 110 | 166 | 166 | 166 |
| O-11 | 166 | | | | | | | | | |
| O-12 | | 106 | | | | | | | | |
| O-19 | | | 166 | | | | | | | |
| O-20 | | | | 166 | | | | | | |
| Superbeckamine L-121-60 | 33 | 33 | 33 | 33 | 25 | 17 | 55 | | | |
| Uvan 22R | | | | | | | | 40 | | |
| Uvan 21R | | | | | | | | | 40 | |
| Uvan 2028 | | | | | | | | | | 27 |
| P-198 | 6 | 6 | 6 | 6 | 5 | 5 | 6 | 6 | 6 | 6 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Aluminum paste | 10 | 10 | 10 | 10 | 10 | 10 | 10 | 10 | 10 | 10 |
| Modaflow | 0.3 | 0.3 | 0.3 | 0.3 | 0.3 | 0.3 | 0.3 | 0.3 | 0.3 | 0.3 |
| Properties | | | | | | | | | | |
| Cont. of CP | 24 | 13 | 24 | 24 | 24 | 24 | 24 | 24 | 24 | 24 |
| Posi. of OH | 26 | 19 | 22 | 26 | 26 | 26 | 26 | 26 | 26 | 26 |
| Mn *3 (× 10³) | 24 | 18 | 16 | 16 | 15 | 15 | 15 | 15 | 15 | 15 |
| Mw *3 (× 10³) | 90 | 80 | 75 | 75 | 75 | 75 | 75 | 75 | 75 | 75 |
| Amo. of OH | 1.0 | 2.1 | 1.0 | 1.0 | 1.0 | 1.0 | 1.0 | 1.0 | 1.0 | 1.0 |
| Mn *5 (× 10²) | 15 | 15 | 15 | 15 | 15 | 15 | 15 | 18 | 20 | 10 |
| Mw *5 (× 10²) | 41 | 41 | 41 | 41 | 41 | 41 | 41 | 70 | 110 | 15 |
| RR | 71/29 | 71/29 | 71/29 | 71/29 | 77/23 | 83/17 | 50/50 | 71/29 | 71/29 | 71/29 |
| TAV | 32 | 32 | 32 | 32 | 29 | 29 | 33 | 32 | 32 | 32 |
| Performance | | | | | | | | | | |
| 120° C., 20 min. | | | | | | | | | | |
| Adhesion | ○ | ○ | ○ | ○ | ○ | ○ | ○ | ○ | ○ | ○ |
| Wat. res. | ○ | ○ | ○ | ○ | ○ | ○ | ○ | ○ | ○ | ○ |
| Gross | 90 | 91 | 94 | 89 | 93 | 91 | 93 | 91 | 93 | 83 |

TABLE 6-continued

| | | | | | | | | | | |
|---|---|---|---|---|---|---|---|---|---|---|
| Gas. res. | ◯ | ◯ | ◯ | ◯ | ◯ | ◯ | ◯ | ◯ | ◯ | ◯ |
| Wea. res. | ◯ | ◯ | ◯ | ◯ | ◯ | ◯ | ◯ | ◯ | ◯ | ◯ |
| 100° C., 30 min. | | | | | | | | | | |
| Adhesion | ◯ | ◯ | ◯ | ◯ | ◯ | ◯ | ◯ | ◯ | ◯ | ◯ |
| Wat. res. | ◯ | ◯ | ◯ | ◯ | ◯ | ◯ | ◯ | ◯ | ◯ | ◯ |
| Gross | 93 | 91 | 90 | 93 | 92 | 93 | 90 | 88 | 91 | 90 |
| Gas. res. | ◯ | ◯ | ◯ | ◯ | ◯ | ◯ | ◯ | ◯ | ◯ | ◯ |
| Wea. res. | ◯ | ◯ | ◯ | ◯ | ◯ | ◯ | ◯ | ◯ | ◯ | ◯ |
| Solid cont. | ◯ | ◯ | ◯ | ◯ | ◯ | ◯ | ◯ | ◯ | ◯ | ◯ |

| | Base coating compositions | | | | | | | | | |
|---|---|---|---|---|---|---|---|---|---|---|
| | BC21 | BC22 | BC23 | BC24 | BC25 | BC26 | BC27 | BC28 | BC29 | BC30 |
| Formulation | | | | | | | | | | |
| O-2 | 166 | | | | | | | | | |
| O-19 | | 166 | 166 | 166 | | | | | | |
| O-20 | | | | | 166 | 166 | 166 | 166 | 166 | 166 |
| Superbeckamine L-121-60 | | | | | | | | 16 | 33 | 33 |
| Uvan 22R | | 40 | | | 40 | | | 20 | | |
| Uvan 21R | | | 40 | | | 40 | | | | |
| Uvan 60R | 40 | | | 40 | | | 40 | | | |
| Paratoluene sulfonic acid | 7 | | | | | | | | | |
| P-198 | | | | | | | | 6 | 1 | 2 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Aluminum paste | 10 | 10 | 10 | 10 | 10 | 10 | 10 | 10 | 10 | 10 |
| Modaflow | 0.3 | 0.3 | 0.3 | 0.3 | 0.3 | 0.3 | 0.3 | 0.3 | 0.3 | 0.3 |
| Properties | | | | | | | | | | |
| Cont. of CP | 24 | 24 | 24 | 24 | 24 | 24 | 24 | 24 | 24 | 24 |
| Posi. of OH | 26 | 22 | 22 | 22 | 26 | 26 | 26 | 26 | 26 | 26 |
| Mn *3 (× 10$^3$) | 15 | 16 | 16 | 16 | 16 | 16 | 16 | 16 | 16 | 16 |
| Mw *3 (× 10$^3$) | 75 | 75 | 75 | 75 | 75 | 75 | 75 | 75 | 75 | 75 |
| Amo. of OH | 1.0 | 1.0 | 1.0 | 1.0 | 1.0 | 1.0 | 1.0 | 1.0 | 1.0 | 1.0 |
| Mn *5 (× 10$^2$) | 18 | 18 | 20 | 18 | 18 | 20 | 18 | 15/15 | 15 | 15 |
| Mw *5 (× 10$^2$) | 70 | 70 | 110 | 70 | 70 | 110 | 70 | 41/70 | 41 | 41 |
| RR | 71/29 | 71/29 | 71/29 | 71/29 | 71/29 | 71/29 | 71/29 | 71/29 | 71/29 | 71/29 |
| TAV | 27 | 21 | 21 | 21 | 21 | 21 | 21 | 32 | 27 | 32 |
| Performance | | | | | | | | | | |
| 120° C., 30 min. | | | | | | | | | | |
| Adhesion | ◯ | ◯ | ◯ | ◯ | ◯ | ◯ | ◯ | ◯ | ◯ | ◯ |
| Wat. res. | Δ | ◯ | ◯ | ◯ | ◯ | ◯ | ◯ | ◯ | ◯ | ◯ |
| Gross | 91 | 90 | 83 | 88 | 90 | 90 | 91 | 91 | 90 | 93 |
| Gas. res. | ◯ | ◯ | ◯ | ◯ | ◯ | ◯ | ◯ | ◯ | ◯ | ◯ |
| Wea. res. | ◯ | ◯ | ◯ | ◯ | ◯ | ◯ | ◯ | ◯ | ◯ | ◯ |
| 100° C., 30 min. | | | | | | | | | | |
| Adhesion | ◯ | ◯ | ◯ | ◯ | ◯ | ◯ | ◯ | ◯ | ◯ | ◯ |
| Wat. res. | Δ | ◯ | ◯ | ◯ | ◯ | ◯ | ◯ | ◯ | ◯ | ◯ |
| Gross | 91 | 88 | 88 | 91 | 93 | 83 | 92 | 90 | 87 | 92 |
| Gas. res. | ◯ | ◯ | ◯ | ◯ | ◯ | ◯ | ◯ | ◯ | ◯ | ◯ |
| Wea. res. | ◯ | ◯ | ◯ | ◯ | ◯ | ◯ | ◯ | ◯ | ◯ | ◯ |
| Solid cont. | ◯ | ◯ | ◯ | ◯ | ◯ | ◯ | ◯ | ◯ | ◯ | ◯ |

| | Base coating compositions | | | | | | |
|---|---|---|---|---|---|---|---|
| | BC31 | BC32 | BC33 | BC34 | BC35 | BC36 | BC37 |
| Formulation | | | | | | | |
| O-2 | | 166 | 166 | 133 | 133 | 110 | 110 |
| O-20 | 166 | | | | | | |
| Superbeckamine L-121-60 | 33 | 33 | 33 | 33 | 33 | 33 | 33 |
| P-198 | 3 | 3 | 9 | 6 | 3 | 6 | 3 |

TABLE 6-continued

| | | | | | | | |
|---|---|---|---|---|---|---|---|
| Butyl acetate | 10 | 10 | 10 | 10 | 10 | 10 | 10 |
| Xylene | 10 | 10 | 10 | 10 | 10 | 10 | 10 |
| Tinuvin 384 | 2 | 2 | 2 | 2 | 2 | 2 | 2 |
| Sanol LS292 | 1 | 1 | 1 | 1 | 1 | 1 | 1 |
| Aluminum paste | 10 | 10 | 10 | 10 | 10 | 10 | 10 |
| Modaflow | 0.3 | 0.3 | 0.3 | 0.3 | 0.3 | 0.3 | 0.3 |
| Hardrene 1511B | | | | 33 | 33 | | |
| Superchlon 822 | | | | | | 40 | 40 |

Properties

| | | | | | | | |
|---|---|---|---|---|---|---|---|
| Cont. of CP | 24 | 24 | 24 | 25 | 25 | 24 | 24 |
| Posi. of OH | 26 | 26 | 26 | 26 | 26 | 26 | 26 |
| Mn *3 (× 10³) | 16 | 15 | 15 | 15 | 15 | 15 | 15 |
| Mw *3 (× 10³) | 75 | 75 | 75 | 75 | 75 | 75 | 75 |
| Amo. of OH | 1.0 | 1.0 | 1.0 | 0.8 | 0.8 | 0.8 | 0.8 |
| Mn *5 (× 10²) | 15 | 15 | 15 | 15 | 15 | 15 | 15 |
| Mw *5 (× 10²) | 41 | 41 | 41 | 41 | 41 | 41 | 41 |
| RR | 71/29 | 71/29 | 71/29 | 71/29 | 71/29 | 71/29 | 71/29 |
| TAV | 37 | 17 | 46 | 32 | 17 | 32 | 17 |

Performance

120° C., 30 min.

| | | | | | | | |
|---|---|---|---|---|---|---|---|
| Adhesion | ○ | ○ | ○ | ○ | ○ | ○ | ○ |
| Wat. res. | ○ | ○ | ○ | ○ | ○ | ○ | ○ |
| Gross | 90 | 88 | 93 | 95 | 92 | 93 | 96 |
| Gas. res. | ○ | ○ | ○ | ○ | ○ | ○ | ○ |
| Wea. res. | ○ | ○ | ○ | ○ | ○ | ○ | ○ |

100° C., 30 min.

| | | | | | | | |
|---|---|---|---|---|---|---|---|
| Adhesion | ○ | ○ | ○ | ○ | ○ | ○ | ○ |
| Wat. res. | ○ | ○ | ○ | ○ | ○ | ○ | ○ |
| Gross | 91 | 89 | 90 | 91 | 96 | 93 | 94 |
| Gas. res. | ○ | Δ | ○ | ○ | Δ | ○ | Δ |
| Wea. res. | ○ | ○ | ○ | ○ | ○ | ○ | ○ |
| Solid cont. | ○ | ○ | ○ | ○ | ○ | ○ | ○ |

| | Base coating compositions | | | | | | | | | |
|---|---|---|---|---|---|---|---|---|---|---|
| | BC38 | BC39 | BC40 | BC41 | BC42 | BC43 | BC44 | BC45 | BC46 | BC47 |

Formulation

| | | | | | | | | | | |
|---|---|---|---|---|---|---|---|---|---|---|
| B-1 | 166 | | | | | 83 | | | | |
| B-2 | | 166 | | | | | | | | |
| B-3 | | | 166 | | | | | | | |
| B-4 | | | | 98 | | | | | | |
| B-5 | | | | | 152 | | | | | |
| B-6 | | | | | | 100 | | | | |
| B-7 | | | | | | | 166 | | | |
| B-8 | | | | | | | | 166 | | |
| B-9 | | | | | | | | | 166 | |
| B-10 | | | | | | | | | | 106 |
| Superbeckamine L-121-60 | 33 | 33 | 33 | 33 | 33 | 33 | 33 | 33 | 33 | 33 |
| P-198 | 6 | 6 | 6 | 6 | 6 | 6 | 6 | 6 | 6 | 6 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Aluminum paste | 10 | 10 | 10 | 10 | 10 | 10 | 10 | 10 | 10 | 10 |
| Modaflow | 0.3 | 0.3 | 0.3 | 0.3 | 0.3 | 0.3 | 0.3 | 0.3 | 0.3 | 0.3 |

Properties

| | | | | | | | | | | |
|---|---|---|---|---|---|---|---|---|---|---|
| Cont. of CP | 24 | 24 | 24 | 9 | 49 | 12 | 24 | 24 | 24 | 24 |
| Posi. of OH | 19 | 26 | 33 | 33 | 19 | 19/26 | 33 | 26 | 26 | 26 |
| Mn *3 (× 10³) | 14 | 15 | 16 | 16 | 17 | 14/16 | 8 | 31 | 25 | 17 |
| Mn *3 (× 10³) | 75 | 75 | 75 | 75 | 80 | 75/80 | 60 | 95 | 90 | 75 |

TABLE 6-continued

| Amo. of OH | 1.2 | 1.0 | 1.0 | 1.0 | 0.8 | 1.2/1.0 | 1.0 | 1.0 | 1.0 | 1.9 |
|---|---|---|---|---|---|---|---|---|---|---|
| Mn *5 ($\times 10^2$) | 15 | 15 | 15 | 15 | 15 | 15 | 15 | 15 | 15 | 15 |
| Mw *5 ($\times 10^2$) | 41 | 41 | 41 | 41 | 41 | 41 | 41 | 41 | 41 | 41 |
| RR | 71/29 | 71/29 | 71/29 | 71/29 | 71/29 | 71/29 | 71/29 | 71/29 | 71/29 | 71/29 |
| TAV | 32 | 32 | 32 | 32 | 32 | 32 | 32 | 32 | 32 | 32 |

Properties

120° C., 30 min.

| Adhesion | ○ | ○ | ○ | ○ | ○ | ○ | ○ | ○ | ○ | ○ |
|---|---|---|---|---|---|---|---|---|---|---|
| Wat. res. | ○ | ○ | ○ | Δ | ○ | ○ | ○ | ○ | ○ | ○ |
| Gross | 89 | 94 | 90 | 91 | 93 | 91 | 90 | 88 | 91 | 89 |
| Gas. res. | ○ | ○ | ○ | ○ | ○ | ○ | ○ | ○ | ○ | ○ |
| Wea. res. | ○ | ○ | ○ | ○ | ○ | ○ | ○ | ○ | ○ | ○ |

100° C., 30 min.

| Adhesion | ○ | ○ | ○ | ○ | ○ | ○ | ○ | ○ | ○ | ○ |
|---|---|---|---|---|---|---|---|---|---|---|
| Wat. res. | ○ | ○ | ○ | ○ | ○ | ○ | ○ | ○ | ○ | ○ |
| Gross | 91 | 92 | 90 | 93 | 91 | 93 | 91 | 91 | 90 | 91 |
| Gas. res. | ○ | ○ | ○ | ○ | Δ | ○ | ○ | ○ | ○ | ○ |
| Wea. res. | ○ | ○ | ○ | ○ | ○ | ○ | ○ | ○ | ○ | ○ |
| Solid cont. | ○ | ○ | ○ | ○ | ○ | ○ | ○ | ○ | ○ | ○ |

|  | Base coating compositions | | | | | | |
|---|---|---|---|---|---|---|---|
|  | BC48 | BC49 | BC50 | BC51 | BC52 | BC53 | BC54 |

Formulation

| B-1 |  |  |  |  |  |  | 83 |
|---|---|---|---|---|---|---|---|
| B-2 | 166 | 166 | 166 | 166 | 166 | 166 |  |
| O-1 |  |  |  |  |  |  | 83 |
| Uvan 60R |  |  |  |  |  | 40 |  |
| Uvan 2028 |  |  |  |  | 27 |  |  |
| Uvan 22R |  |  |  | 40 |  |  |  |
| Superbeckamine L-121-60 | 25 | 17 | 55 |  |  |  | 33 |
| Paretoluene sulfonic acid |  |  |  |  |  | 7 |  |
| P-198 | 5 | 5 | 6 | 6 | 6 |  | 6 |
| Butyl acetate | 10 | 10 | 10 | 10 | 10 | 10 | 10 |
| Xylene | 10 | 10 | 10 | 10 | 10 | 10 | 10 |
| Tinuvin 384 | 2 | 2 | 2 | 2 | 2 | 2 | 2 |
| Sanol LS292 | 1 | 1 | 1 | 1 | 1 | 1 | 1 |
| Aluminum paste | 10 | 10 | 10 | 10 | 10 | 10 | 10 |
| Modaflow | 0.3 | 0.3 | 0.3 | 0.3 | 0.3 | 0.3 | 0.3 |

Properties

| Cont. of CP | 24 | 24 | 24 | 24 | 24 | 24 | 24 |
|---|---|---|---|---|---|---|---|
| Posi. of OH | 26 | 26 | 26 | 26 | 26 | 26 | 19 |
| Mn *3 ($\times 10^3$) | 15 | 15 | 15 | 15 | 15 | 15 | 14/15 |
| Mw *3 ($\times 10^3$) | 75 | 75 | 75 | 75 | 75 | 75 | 75/75 |
| Amo. of OH | 1.0 | 1.0 | 1.0 | 1.0 | 1.0 | 1.0 | 1.2 |
| Mn *5 ($\times 10^2$) | 15 | 15 | 15 | 18 | 10 | 18 | 15 |
| Mw *5 ($\times 10^2$) | 41 | 41 | 41 | 70 | 15 | 70 | 41 |
| RR | 77/23 | 83/17 | 50/50 | 71/29 | 71/29 | 71/29 | 71/29 |
| TAV | 29 | 29 | 33 | 32 | 32 | 27 | 32 |

Properties

120° C., 30 min.

| Adhesion | ○ | ○ | ○ | ○ | ○ | ○ | ○ |
|---|---|---|---|---|---|---|---|
| Wat. res. | ○ | ○ | ○ | ○ | ○ | Δ | ○ |
| Gross | 91 | 90 | 86 | 94 | 91 | 86 | 93 |
| Gas. res. | ○ | ○ | ○ | ○ | ○ | ○ | ○ |
| Wea. res. | ○ | ○ | ○ | ○ | ○ | ○ | ○ |

100° C., 30 min.

| Adhesion | ○ | ○ | ○ | ○ | ○ | ○ | ○ |
|---|---|---|---|---|---|---|---|
| Wat. res. | ○ | ○ | ○ | ○ | ○ | Δ | ○ |
| Gross | 93 | 93 | 94 | 90 | 93 | 90 | 91 |
| Gas. res. | ○ | ○ | ○ | ○ | ○ | ○ | ○ |

TABLE 6-continued

| | | | | | | | |
|---|---|---|---|---|---|---|---|
| Wea. res. | ○ | ○ | ○ | ○ | ○ | ○ | ○ |
| Solid cont. | ○ | ○ | ○ | ○ | ○ | ○ | ○ |

| | Base coating compositions | | | | | | | | | |
|---|---|---|---|---|---|---|---|---|---|---|
| | BC55 | BC56 | BC57 | BC58 | BC59 | BC60 | BC61 | BC62 | BC63 | BC64 |
| Formulation | | | | | | | | | | |
| B-2 | 83 | 83 | 166 | 166 | | | | 166 | | |
| B-11 | | | | | | | 166 | | | |
| O-2 | 83 | | | | | | | | 166 | 166 |
| O-13 | | | | | 166 | | | | | |
| O-19 | | 83 | | | | | | | | |
| O-22 | | | | | | 166 | | | | |
| Superbeckamine L-121-60 | 33 | 33 | 33 | 33 | | | | | | |
| Uvan 21R | | | | | 40 | 40 | 40 | 40 | 40 | 40 |
| P-198 | 6 | 3 | 3 | 9 | 6 | 6 | 6 | 2 | 2 | 1 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| Aluminum paste | 10 | 10 | 10 | 10 | 10 | 10 | 10 | 10 | 10 | 10 |
| Modaflow | 0.3 | 0.3 | 0.3 | 0.3 | 0.3 | 0.3 | 0.3 | 0.3 | 0.3 | 0.3 |
| Properties | | | | | | | | | | |
| Cont. of CP | 24 | 24 | 24 | 24 | 24 | 24 | 24 | 24 | 24 | 24 |
| Posi. of OH | 26 | 26 | 26 | 26 | 26 | 26 | 26 | 26 | 26 | 26 |
| Mn *3 (× 10$^3$) | 15 | 15/18 | 15 | 15 | 15 | 15 | 16 | 15 | 15 | 15 |
| Mw *3 (× 10$^3$) | 75 | 75/75 | 75 | 75 | 75 | 75 | 75 | 75 | 75 | 75 |
| Amo. of OH | 1.0 | 1.0 | 1.0 | 1.0 | 0.5 | 0.4 | 0.5 | 1.0 | 1.0 | 1.0 |
| Mn *5 (× 10$^2$) | 15 | 15 | 15 | 15 | 20 | 20 | 20 | 20 | 20 | 20 |
| Mw *5 (× 10$^2$) | 41 | 41 | 41 | 41 | 110 | 110 | 110 | 110 | 110 | 110 |
| RR | 71/29 | 71/29 | 71/29 | 71/29 | 71/29 | 71/29 | 71/29 | 71/29 | 71/29 | 71/29 |
| TAV | 32 | 27 | 17 | 46 | 32 | 32 | 32 | 11 | 11 | 6 |
| Performance | | | | | | | | | | |
| 120° C., 30 min. | | | | | | | | | | |
| Adhesion | ○ | ○ | ○ | ○ | ○ | ○ | ○ | ○ | ○ | ○ |
| Wat. res. | ○ | ○ | ○ | ○ | ○ | ○ | ○ | ○ | ○ | ○ |
| Gross | 91 | 94 | 90 | 94 | 90 | 91 | 89 | 90 | 90 | 92 |
| Gas. res. | ○ | ○ | ○ | ○ | ○ | ○ | ○ | ○ | ○ | ○ |
| Wea. res. | ○ | ○ | ○ | ○ | ○ | ○ | ○ | ○ | ○ | ○ |
| 100° C., 30 min. | | | | | | | | | | |
| Adhesion | ○ | ○ | ○ | ○ | ○ | ○ | ○ | ○ | ○ | ○ |
| Wat. res. | ○ | ○ | ○ | ○ | Δ | Δ | ○ | ○ | ○ | Δ |
| Gross | 93 | 90 | 93 | 94 | 91 | 92 | 90 | 90 | 91 | 90 |
| Gas. res. | ○ | ○ | ○ | ○ | Δ | ○ | ○ | ○ | ○ | Δ |
| Wea. res. | ○ | ○ | ○ | ○ | ○ | ○ | ○ | ○ | ○ | ○ |
| Solid cont. | ○ | ○ | ○ | ○ | ○ | ○ | ○ | ○ | ○ | ○ |

TABLE 7

| | Comparative coating compositions | | | | | | | | |
|---|---|---|---|---|---|---|---|---|---|
| | H1 | H2 | H3 | H4 | H5 | H6 | H7 | H8 | H9 |
| Formulation | | | | | | | | | |
| O-7 | 100 | | | | | | | | |
| O-4 | | 83 | | | | | | | |
| O-8 | | 50 | | | | | | | |
| O-14 | | | 89 | | | | | | |
| O-15 | | | | 166 | | | | | |
| O-16 | | | | | 166 | | | | |
| O-17 | | | | | | 166 | | | |
| O-18 | | | | | | | 166 | | |
| O-2 | | | | | | | | 166 | 83 |
| Superbeckamine | 33 | 33 | 33 | 33 | 33 | 33 | 33 | 8 | 97 |

TABLE 7-continued

| | | | | | | | | | |
|---|---|---|---|---|---|---|---|---|---|
| L-121-60 | | | | | | | | | |
| P-198 | 6 | 6 | 6 | 6 | 6 | 6 | 6 | 6 | 6 |
| Butyl acetate | 10 | 10 | 10 | 10 | 10 | 10 | 10 | 10 | 10 |
| Xylene | 10 | 10 | 10 | 10 | 10 | 10 | 10 | 10 | 10 |
| Tinuvin 384 | 2 | 2 | 2 | 2 | 2 | 2 | 2 | 2 | 2 |
| Sanol LS292 | 1 | 1 | 1 | 1 | 1 | 1 | 1 | 1 | 1 |
| CR-95 | 50 | 50 | 50 | 50 | 50 | 50 | 50 | 50 | 50 |
| Modaflow | 0.3 | 0.3 | 0.3 | 0.3 | 0.3 | 0.3 | 0.3 | 0.3 | 0.3 |

Properties

| | | | | | | | | | |
|---|---|---|---|---|---|---|---|---|---|
| Cont. of CP | 3 | 4.5 | 3 | 24 | 24 | 24 | 24 | 24 | 24 |
| Posi. of OH | 22 | 33/26 | 19 | 12 | 47 | 33 | 33 | 26 | 26 |
| Mn *3 (× 10³) | 19 | 18/16 | 20 | 15 | 16 | 4 | 60 | 15 | 15 |
| Mw *3 (× 10³) | 80 | 80/75 | 85 | 75 | 75 | 40 | 150 | 75 | 75 |
| Amo. of OH | 1.0 | 1.0 | 2.7 | 1.0 | 0.8 | 1.0 | 1.0 | 1.0 | 1.0 |
| Mn *5 (× 10²) | 15 | 15 | 15 | 15 | 15 | 15 | 15 | 15 | 15 |
| Mw *5 (× 10²) | 41 | 41 | 41 | 41 | 41 | 41 | 41 | 41 | 41 |
| RR | 71/29 | 71/29 | 71/29 | 71/29 | 71/29 | 71/29 | 71/29 | 91/9 | 30/70 |
| TAV | 32 | 32 | 32 | 32 | 32 | 32 | 32 | 32 | 32 |

Performance

120° C., 30 min.

| | | | | | | | | | |
|---|---|---|---|---|---|---|---|---|---|
| Adhesion | X | X | ○ | ○ | ○ | ○ | ○ | ○ | ○ |
| Wat. res. | X | X | ○ | ○ | ○ | ○ | ○ | ○ | ○ |
| Gross | 84 | 83 | 86 | 83 | 82 | 86 | 83 | 85 | 81 |
| Gas. res. | ○ | ○ | X | X | X | X | ○ | X | X |
| Wea. res. | ○ | ○ | ○ | X | ○ | X | ○ | ○ | X |

100° C., 30 min.

| | | | | | | | | | |
|---|---|---|---|---|---|---|---|---|---|
| Adhesion | X | X | ○ | ○ | ○ | ○ | ○ | ○ | ○ |
| Wat. res. | X | X | ○ | Δ | ○ | ○ | ○ | ○ | ○ |
| Gross | 80 | 80 | 88 | 81 | 85 | 81 | 83 | 82 | 82 |
| Gas. res. | Δ | ○ | X | X | X | X | ○ | X | X |
| Wea. res. | ○ | ○ | ○ | X | ○ | X | ○ | X | X |
| Solid cont. | ○ | ○ | ○ | ○ | ○ | ○ | X | ○ | ○ |

| | Comparative coating compositions | | | | | | |
|---|---|---|---|---|---|---|---|
| | H10 | H11 | H12 | H13 | H14 | H15 | H16 |

Formulation

| | | | | | | | |
|---|---|---|---|---|---|---|---|
| O-7 | | | 100 | | | | |
| O-4 | | | | 83 | | | |
| O-8 | | | | 50 | | | |
| O-14 | | | | | 89 | | |
| O-15 | | | | | | 166 | |
| O-16 | | | | | | | 166 |
| B-4 | 50 | | | | | | |
| B-6 | 50 | | | | | | |
| B-2 | | 166 | | | | | |
| Superbeckamine L-121-60 | 33 | 33 | 33 | 33 | 33 | 33 | 33 |
| Aluminum paste | | | 10 | 10 | 10 | 10 | 10 |
| P-198 | 6 | 12 | 6 | 6 | 6 | 6 | 6 |
| Butyl acetate | 10 | 10 | 10 | 10 | 10 | 10 | 10 |
| Xylene | 10 | 10 | 10 | 10 | 10 | 10 | 10 |
| Tinuvin 384 | 2 | 2 | 2 | 2 | 2 | 2 | 2 |
| Sanol LS292 | 1 | 1 | 1 | 1 | 1 | 1 | 1 |
| CR-95 | 50 | 50 | | | | | |
| Modaflow | 0.3 | 0.3 | 0.3 | 0.3 | 0.3 | 0.3 | 0.3 |

Properties

| | | | | | | | |
|---|---|---|---|---|---|---|---|
| Cont. of CP | 4.5 | 24 | 3 | 4.5 | 3 | 24 | 24 |
| Posi. of OH | 33/26 | 26 | 22 | 33/26 | 19 | 12 | 47 |
| Mn *3 (× 10³) | 16/16 | 15 | 19 | 18/16 | 20 | 15 | 16 |
| Mw *3 (× 10³) | 75/80 | 75 | 80 | 80/75 | 85 | 75 | 75 |
| Amo. of OH | 1.0 | 1.0 | 1.0 | 1.0 | 2.7 | 1.0 | 0.8 |
| Mn *5 (× 10²) | 15 | 15 | 15 | 15 | 15 | 15 | 15 |
| Mw *5 (× 10²) | 41 | 41 | 41 | 41 | 41 | 41 | 41 |
| RR | 71/29 | 71/29 | 71/29 | 71/29 | 71/29 | 71/29 | 71 |
| TAV | 32 | 58 | 32 | 32 | 32 | 32 | 32 |

TABLE 7-continued

| Performance | | | | | | | | |
|---|---|---|---|---|---|---|---|---|
| 120° C., 30 min. | | | | | | | | |
| Adhesion | X | ○ | X | X | ○ | ○ | ○ | |
| Wat. res. | X | X | X | X | ○ | ○ | ○ | |
| Gross | 88 | 86 | 90 | 93 | 95 | 94 | 94 | |
| Gas. res. | ○ | ○ | ○ | ○ | X | X | ○ | |
| Wea. res. | ○ | ○ | ○ | ○ | ○ | X | ○ | |
| 100° C., 30 min. | | | | | | | | |
| Adhesion | X | ○ | X | X | ○ | ○ | ○ | |
| Wat. res. | X | X | X | X | ○ | ○ | Δ | |
| Gross | 83 | 83 | 91 | 96 | 94 | 95 | 92 | |
| Gas. res. | ○ | ○ | ○ | Δ | X | X | X | |
| Wea. res. | ○ | ○ | ○ | ○ | X | ○ | X | |
| Solid cont. | ○ | ○ | ○ | ○ | ○ | ○ | ○ | |

| | Comparative coating compositions | | | | | | | | | |
|---|---|---|---|---|---|---|---|---|---|---|
| | H17 | H18 | H19 | H20 | H21 | H22 | H23 | H24 | H25 | H26 |
| Formulation | | | | | | | | | | |
| O-17 | 166 | | | | | | | | | |
| O-18 | | 166 | | | | | | | | |
| O-2 | | | 166 | 83 | | | | | 166 | 166 |
| O-23 | | | | | | | | 166 | | |
| B-4 | | | | | 83 | | | | | |
| B-6 | | | | | 50 | | | | | |
| B-2 | | | | | | 166 | | | | |
| Hardrene 15LLB | | | | | | | 167 | | | |
| Uvan 122 | | | | | | | 167 | | | |
| Uvan 21R | | | | | | | | 40 | 40 | 40 |
| O-21 | | | | | | | 100 | | | |
| Superbeckamine L-121-60 | 33 | 33 | 8 | 97 | 33 | 33 | 13 | 33 | | |
| Aluminum paste | 10 | 10 | 10 | 10 | 10 | 10 | | | | |
| P-198 | 6 | 6 | 6 | 6 | 6 | 12 | | 6 | 0.5 | 0.5 |
| Butyl acetate | 10 | 10 | 10 | 10 | 10 | 10 | 10 | 10 | 10 | 10 |
| Xylene | 10 | 10 | 10 | 10 | 10 | 10 | 10 | 10 | 10 | 10 |
| Tinuvin 384 | 2 | 2 | 2 | 2 | 2 | 2 | | 2 | 2 | 2 |
| Sanol LS292 | 1 | 1 | 1 | 1 | 1 | 1 | | 1 | 1 | 1 |
| CR-95 | | | | | | | | | 50 | |
| Modaflow | 0.3 | 0.3 | 0.3 | 0.3 | 0.3 | 0.3 | 1 | 0.3 | 0.3 | 0.3 |
| Properties | | | | | | | | | | |
| Cont. of CP | 24 | 24 | 24 | 24 | 4.5 | 24 | 15 | 24 | 24 | 24 |
| Posi. of OH | 33 | 33 | 26 | 26 | 33/26 | 26 | 5 | 26 | 26 | 26 |
| Mn *3 (× 10³) | 4 | 60 | 15 | 15 | 16/16 | 15 | 20 | 15 | 15 | 15 |
| Mw *3 (× 10³) | 40 | 150 | 75 | 75 | 75/80 | 75 | 85 | 75 | 75 | 75 |
| Amo. of OH | 1.0 | 1.0 | 1.0 | 1.0 | 1.0 | 1.0 | 0.45 | 0.35 | 1.0 | 1.0 |
| Mn *5 (× 10²) | 15 | 15 | 15 | 15 | 15 | 15 | 15 | 20 | 20 | 20 |
| Mw *5 (× 10²) | 41 | 41 | 41 | 41 | 41 | 41 | 41 | 110 | 110 | 110 |
| RR | 71/29 | 71/29 | 91/9 | 30/70 | 71/29 | 71/29 | 93/7 | 71/29 | 71/29 | 71/29 |
| TAV | 32 | 32 | 32 | 32 | 32 | 58 | 0 | 32 | 3 | 3 |
| Performance | | | | | | | | | | |
| 120° C., 30 min. | | | | | | | | | | |
| Adhesion | ○ | ○ | ○ | ○ | X | ○ | * | ○ | ○ | Δ |
| Wat. res. | ○ | ○ | ○ | ○ | X | X | * | Δ | X | X |
| Gross | 93 | 93 | 94 | 92 | 90 | 90 | * | 89 | 84 | 89 |
| Gas. res. | X | ○ | X | X | ○ | ○ | * | Δ | X | X |
| Wea. res. | X | ○ | ○ | X | ○ | ○ | * | ○ | X | X |
| 100° C., 30 min. | | | | | | | | | | |
| Adhesion | ○ | ○ | ○ | ○ | X | ○ | * | ○ | Δ | Δ |
| Wat. res. | ○ | ○ | X | X | X | X | * | X | X | X |
| Gross | 91 | 90 | 94 | 95 | 90 | 91 | * | 88 | 85 | 90 |
| Gas. res. | X | ○ | X | X | ○ | ○ | * | Δ | X | X |
| Wea. res. | X | ○ | X | X | X | X | * | X | X | X |
| Solid cont. | ○ | X | ○ | ○ | ○ | ○ | ○ | ○ | ○ | ○ |

Note: *No curing.

The present coating composition has an excellent low temperature curability and a high solid content, as well as provides the coating having good adhesion, water resistance, gross, gasoline resistance and weathering resistance. Further, since the present coating composition does not contain any isocyanate prepolymer, the handling of the coating composition is easy and safe.

What is claimed is:

1. A resin composition used in a coating composition for polyolefin resin moldings, comprising:
   (1) 40–90 wt. % of a grafted and chlorinated polyolefin oligomer obtained by graft polymerizing a vinyl polymerizable monomer to a chlorinated polyolefin, said grafted and chlorinated polyolefin oligomer having a primary hydroxyl group at a position of 15 to 40 atoms away from the vinyl graft polymer chain grafted to the chlorinated polyolefin, a number average molecular weight of 5,000 to 50,000, a weight average molecular weight of 5,000 to 100,000, 0.4 to 2.5 mole/kg-resin of a primary hydroxyl group, 50 to 95 wt. % of said vinyl graft polymer chain, and 5 to 50 wt. % of the chlorinated polyolefin used as a starting material, and
   (2) 60 to 10 wt. % of an imino, methylol or complete alkoxy melamine resin having a weight average molecular weight of 300 to 20,000.

2. The resin composition of claim 1 wherein said melamine resin has a number average molecular weight of 300 to 4,000.

3. A resin composition used in a coating composition for polyolefin resin moldings, comprising:
   (1) 40–90 wt. % of a grafted and chlorinated polyolefin oligomer obtained by graft polymerizing a vinyl polymerizable monomer to a chlorinated polyolefin, said grafted and chlorinated polyolefin oligomer having a primary hydroxyl group at a position of 15 to 40 atoms away from the vinyl graft polymer chain grafted to the chlorinated polyolefin, a number average molecular weight of 5,000 to 50,000, 0.8 to 2.5 mole/kg-resin of a primary hydroxyl group, 50 to 95 wt. % of said vinyl graft polymer chain, and 5 to 50 wt. % of the chlorinated polyolefin used as a starting material, and
   (2) 60 to 10 wt. % of an imino, methylol or complete alkoxy melamine resin.

4. A coating composition for polyolefin resin moldings, comprising:
   (1) 40–90 wt. % of a grafted and chlorinated polyolefin oligomer obtained by graft polymerizing a vinyl polymerizable monomer to a chlorinated polyolefin, said grafted and chlorinated polyolefin oligomer having a primary hydroxyl group at a position of 15 to 40 atoms away from the vinyl graft polymer chain grafted to said chlorinated polyolefin, a number average molecular weight of 5,000 to 50,000, a weight average molecular weight of 5,000 to 100,000, 0.4 to 2.5 mole/kg-resin of a primary hydroxyl group, 50 to 95 wt. % of said vinyl graft polymer chain, and 5 to 50 wt. % of the chlorinated polyolefin used as a starting material, and
   (2) 60 to 10 wt. % of an imino, methylol or complete alkoxy melamine resin having a weight average molecular weight of 300 to 20,000,
   wherein the total acid value of said grafted and chlorinated polyolefin oligomer, said melamine resin and, if any, an acid curing catalyst is 5 to 50.

5. The coating composition of claim 4 wherein said melamine resin has a number average molecular weight of 300 to 4,000.

6. A coating composition for polyolefin resin moldings, comprising:
   (1) 40–90 wt. % of a grafted and chlorinated polyolefin oligomer obtained by graft polymerizing a vinyl polymerizable monomer to a chlorinated polyolefin, said grafted and chlorinated polyolefin oligomer having a primary hydroxyl group at a position of 15 to 40 atoms away from the vinyl graft polymer chain grafted to said chlorinated polyolefin, a number average molecular weight of 5,000 to 50,000, 0.8 to 2.5 mole/kg-resin of a primary hydroxyl group, 50 to 95 wt. % of said vinyl graft polymer chain, and 5 to 50 wt. % of the chlorinated polyolefin used as a starting material, and
   (2) 60 to 10 wt. % of an imino, methylol or complete alkoxy melamine resin,
   wherein the total acid value of said grafted and chlorinated polyolefin oligomer, said melamine resin and, if any, an acid curing catalyst is 15 to 50.

7. A process for coating the coating composition according to claim 4, comprising coating said coating composition onto a polyolefin resin molding and baking the resultant coating at 90° to 120° C.

8. A process for coating the coating composition according to claim 5, comprising coating said coating composition onto a polyolefin resin molding and baking the resultant coating at 90° to 120° C.

9. A process for coating the coating composition according to claim 6, comprising coating said coating composition onto a polyolefin resin molding and baking the resultant coating at 90° to 120° C.

10. A resin composition used in a coating composition for polyolefin resin moldings, comprising:
    (1) 40–90 wt. % of a grafted and chlorinated polyolefin oligomer obtained by graft polymerizing a vinyl polymerizable monomer to a chlorinated polyolefin, said grafted and chlorinated polyolefin oligomer having a blocked primary hydroxyl group at a position of 15 to 40 atoms away from the vinyl graft polymer chain grafted to said chlorinated polyolefin, a number average molecular weight of 5,000 to 50,000, a weight average molecular weight of 5,000 to 100,000, 0.4 to 2.5 mole/kg-resin of a blocked primary hydroxyl group, 50 to 95 wt. % of said vinyl graft polymer chain, and 5 to 50 wt. % of the chlorinated polyolefin used as a starting material, and
    (2) 60 to 10 wt. % of an imino, methylol or complete alkoxy melamine resin.

11. The resin composition of claim 10 wherein said melamine resin has a number average molecular weight of 300 to 4,000.

12. A resin composition used in a coating composition for polyolefin resin moldings, comprising:
    (1) 40–90 wt. % of a grafted and chlorinated polyolefin oligomer obtained by graft polymerizing a vinyl polymerizable monomer to a chlorinated polyolefin, said grafted and chlorinated polyolefin oligomer having a blocked primary hydroxyl group at a position of 15 to 40 atoms away from the vinyl graft polymer chain grafted to said chlorinated polyolefin, a number average molecular weight of 5,000 to 50,000, 0.8 to 2.5 mole/kg-resin of a blocked primary hydroxyl group, 50 to 95 wt. % of said vinyl graft polymer chain, and 5 to 50 wt. % of the chlorinated polyolefin used as a starting material, and
    (2) 60 to 10 wt. % of an imino, methylol or complete alkoxy melamine resin.

13. A coating composition for polyolefin resin moldings, comprising:
- (1) 40–90 wt. % of a grafted and chlorinated polyolefin oligomer obtained by graft polymerizing a vinyl polymerizable monomer to a chlorinated polyolefin, said grafted and chlorinated polyolefin oligomer having a blocked primary hydroxyl group at a position of 15 to 40 atoms away from the vinyl graft polymer chain grafted to said chlorinated polyolefin, a number average molecular weight of 5,000 to 50,000, a weight average molecular weight of 5,000 to 100,000, 0.4 to 2.5 mole/kg-resin of a blocked primary hydroxyl group, 50 to 95 wt. % of said vinyl graft polymer chain, and 5 to 50 wt. % of the chlorinated polyolefin used as a starting material, and
- (2) 60 to 10 wt. % of an imino, methylol or complete alkoxy melamine resin;
- wherein the total acid value of said grafted and chlorinated polyolefin oligomer, said melamine resin and, if any, an acid curing catalyst is 5 to 50.

14. The coating composition of claim 13 wherein said melamine resin has a number average molecular weight of 300 to 4,000.

15. A coating composition for polyolefin resin moldings, comprising:
- (1) 40–90 wt. % of a grafted and chlorinated polyolefin oligomer obtained by graft polymerizing a vinyl polymerizable monomer to a chlorinated polyolefin, said grafted and chlorinated polyolefin oligomer having a blocked primary hydroxyl group at a position of 15 to 40 atoms away from the vinyl graft polymer chain grafted to said chlorinated polyolefin, a number average molecular weight of 5,000 to 50,000, 0.8 to 2.5 mole/kg-resin of a blocked primary hydroxyl group, 50 to 95 wt. % of said vinyl graft polymer chain, and 5 to 50 wt. % of the chlorinated polyolefin used as a starting material, and
- (2) 60 to 10 wt. % of an imino, methylol or complete alkoxy melamine resin;
- wherein the total acid value of said grafted and chlorinated polyolefin oligomer, said melamine resin and, if any, an acid curing catalyst is 15 to 50.

16. A process for coating the coating composition according to claim 13, comprising coating said coating composition onto a polyolefin resin molding and baking the resultant coating at 90° to 120° C.

17. A process for coating the coating composition according to claim 14, comprising coating said coating composition onto a polyolefin resin molding and baking the resultant coating at 90° to 120° C.

18. A process for coating the coating composition according to claim 15, comprising coating said coating composition onto a polyolefin resin molding and baking the resultant coating at 90° to 120° C.

* * * * *